United States Patent
Etches et al.

(10) Patent No.: US 12,288,038 B2
(45) Date of Patent: Apr. 29, 2025

(54) MATCHING SERVICE REQUESTER WITH SERVICE PROVIDERS

(71) Applicant: IQVIA Inc., Parsippany, NJ (US)

(72) Inventors: Robert Etches, Vejle (DK); Jaromir Dzialo, Cracow (PL)

(73) Assignee: IQVIA Inc., Parsippany, NJ (US)

( * ) Notice: Subject to any disclaimer, the term of this patent is extended or adjusted under 35 U.S.C. 154(b) by 262 days.

(21) Appl. No.: 17/728,460

(22) Filed: Apr. 25, 2022

(65) Prior Publication Data
US 2022/0343087 A1    Oct. 27, 2022

Related U.S. Application Data

(60) Provisional application No. 63/178,702, filed on Apr. 23, 2021, provisional application No. 63/178,707, (Continued)

(51) Int. Cl.
  *G06F 40/51* (2020.01)
  *G06F 18/22* (2023.01)
  (Continued)

(52) U.S. Cl.
  CPC ............. *G06F 40/51* (2020.01); *G06F 18/22* (2023.01); *G06F 40/279* (2020.01); *G06F 40/47* (2020.01); *G06F 40/58* (2020.01)

(58) Field of Classification Search
  CPC ........ G06F 40/51; G06F 18/22; G06F 40/279; G06F 40/47; G06F 40/58; G06F 18/24; G06F 40/151; G06F 40/295
  See application file for complete search history.

(56) References Cited

U.S. PATENT DOCUMENTS 6,857,022 B1   2/2005 Scanlan
9,473,437 B1  10/2016 Jakobsson
(Continued)

OTHER PUBLICATIONS

Taghavi, M., Bentahar, J., Otrok, H., & Bakhtiyari, K. (2019). A blockchain-based model for cloud service quality monitoring. IEEE Transactions on Services Computing, 13(2), 276-288. (Year: 2019).*

(Continued)

*Primary Examiner* — Bhavesh M Mehta
*Assistant Examiner* — Philip H Lam
(74) *Attorney, Agent, or Firm* — Fish & Richardson P.C.

(57) ABSTRACT

Systems, methods, devices, and non-transitory, computer-readable storage media are disclosed for matching a service requester with a service provider via a taxonomy based directed graph. The method includes: receiving a keyword associated with a service; accessing a directed graph including a root node and nodes connected by edges, each node having a title; identifying a second node of the directed graph for each of service providers, each second node having a title matching a skill of a respective service provider; determining a distance between the first node and each second node along the directed graph; and ranking the service providers based at least in part on the distance between the first node and each second node. Systems, methods, devices, and non-transitory, computer-readable storage media are further disclosed for determining and storing a quality score for the revised linguistic content.

14 Claims, 14 Drawing Sheets

Related U.S. Application Data filed on Apr. 23, 2021, provisional application No. 63/178,704, filed on Apr. 23, 2021, provisional application No. 63/178,771, filed on Apr. 23, 2021, provisional application No. 63/178,766, filed on Apr. 23, 2021.

(51) Int. Cl.
  *G06F 40/279* (2020.01)
  *G06F 40/47* (2020.01)
  *G06F 40/58* (2020.01)

(56) References Cited

U.S. PATENT DOCUMENTS

| | | | |
|---|---|---|---|
| 10,331,793 | B2 | 6/2019 | Dotterer et al. |
| 10,755,177 | B1* | 8/2020 | Dabney ............... G06N 5/02 |
| 2002/0026308 | A1* | 2/2002 | Osborne ............. G06F 40/211 704/9 |
| 2006/0200339 | A1 | 9/2006 | Satake et al. |
| 2007/0030528 | A1 | 2/2007 | Quaeler et al. |
| 2007/0050182 | A1 | 3/2007 | Sneddon et al. |
| 2007/0294076 | A1 | 12/2007 | Shore et al. |
| 2008/0114564 | A1* | 5/2008 | Ihara ................... G06F 16/35 702/158 |
| 2009/0119091 | A1 | 5/2009 | Sarig |
| 2011/0184722 | A1 | 7/2011 | Sneddon et al. |
| 2013/0004075 | A1 | 1/2013 | Avrahami et al. |
| 2013/0173247 | A1 | 7/2013 | Hodson |
| 2014/0149363 | A1 | 5/2014 | Leeds |
| 2014/0317078 | A1* | 10/2014 | Gallagher ........ G06F 16/24578 707/723 |
| 2014/0358518 | A1 | 12/2014 | Wu et al. |
| 2015/0193850 | A1* | 7/2015 | Tamir .................. G06F 40/40 705/26.61 |
| 2015/0317602 | A1* | 11/2015 | Rao .................. G06Q 10/1053 705/321 |
| 2016/0147738 | A1* | 5/2016 | Geurts .................. G06F 40/47 704/2 |
| 2016/0162478 | A1 | 6/2016 | Blassin et al. |
| 2016/0232156 | A1 | 8/2016 | Orsini et al. |
| 2017/0024461 | A1* | 1/2017 | Mac an tSaoir ...... G06F 16/334 |
| 2017/0076244 | A1* | 3/2017 | Bastide ............. G06Q 50/2057 |
| 2017/0329844 | A1* | 11/2017 | Tacchi ................ G06F 16/9024 |
| 2018/0039622 | A1* | 2/2018 | Bihani .................. G06F 40/47 |
| 2018/0130019 | A1 | 5/2018 | Kolb et al. |
| 2018/0268081 | A1* | 9/2018 | Kearney ............... G06F 40/284 |
| 2019/0236102 | A1 | 8/2019 | Wade et al. |
| 2019/0354544 | A1* | 11/2019 | Hertz .................. G06N 5/025 |
| 2019/0384820 | A1* | 12/2019 | Liu .................... G06F 40/295 |
| 2020/0311683 | A1* | 10/2020 | Chua .................. G06F 18/22 |
| 2020/0394223 | A1* | 12/2020 | Nishimura ........... G06F 16/951 |
| 2021/0026859 | A1 | 1/2021 | Vangala et al. |
| 2021/0089375 | A1* | 3/2021 | Ghafourifar ........... G06F 9/453 |
| 2021/0133612 | A1* | 5/2021 | Sinha .................. G06F 30/20 |
| 2021/0326537 | A1 | 10/2021 | Liu et al. |
| 2021/0397897 | A1* | 12/2021 | Shae .................. G06F 18/217 |
| 2022/0027508 | A1 | 1/2022 | Rao |
| 2022/0067305 | A1 | 3/2022 | Shimizu |
| 2022/0207587 | A1* | 6/2022 | Yang ................... G06V 40/10 |
| 2022/0343085 | A1 | 10/2022 | Etches et al. |

OTHER PUBLICATIONS

Shvaiko, P., & Euzenat, J. (2005). A survey of schema-based matching approaches. In Journal on data semantics IV (pp. 146-171). Berlin, Heidelberg: Springer Berlin Heidelberg. (Year: 2005).*
Paolucci, M., Kawamura, T., Payne, T. R., & Sycara, K. (2002). Semantic matching of web services capabilities. In The Semantic Web-ISWC 2002: First International Semantic Web Conference Sardinia, Italy, Jun. 9-12, 2002 Proceedings 1 (pp. 333-347). Springer Berlin Heidelberg. (Year: 2002).*
International Search Report and Written Opinion in International Appln. No. PCT/US2022/71898, dated Jun. 30, 2022, 10 pages.
International Search Report and Written Opinion in International Appln. No. PCT/US2022/71901, mailed on Oct. 25, 2022, 10 pages.
[No Author Listed], "World Trade Statistical Review 2017," World Trade Organization, 2017, 181 pages.
Coinmarketcap.com [online], "Monthly Volume Rankings (Currency)," available on or before Mar. 21, 2021, via Internet Archive: Wayback Machine URL<https://web.archive.org/web/20210323005047/https://coinmarketcap.com/currencies/volume/monthly/>, retrieved on Mar. 15, 2024, URL<https://coinmarketcap.com/currencies/volume/monthly/>, 8 pages.
En.m.wikipedia.org [online], "File:Hash tree.png," Dec. 20, 2010, retrieved on Mar. 15, 2024, retrieved from URL<https://en.m.wikipedia.org/wiki/File:Hash_tree.png>, 3 pages.
En.wikipedia.org [online], "Neural machine translation," last edited on Feb. 18, 2024, available on or before Jun. 21, 2016, retrieved on Mar. 15, 2024, retrieved from URL<https://en.wikipedia.org/wiki/Neural_machine translation>, 9 pages.
En.wikipedia.org [online], "Vitalik Buterin", last edited on Mar. 3, 2024, available on or before Mar. 6, 2014, retrieved on Mar. 15, 2024, retrieved from URL<https://en.wikipedia.org/wiki/Vitalik_Buterin>, 10 pages.
etherscan.io/ [online], "The Ethereum Blockchain Explorer," available on or before Mar. 26, 2021, via Internet Archive: Wayback Machine URL<https://web.archive.org/web/20210326001554/https://etherscan.io/>, retrieved on Mar. 15, 2024, URL<https://web.archive.org/web/20210326001554/https://etherscan.io/>, 2 pages.
ethplorer.io/ [online], "Ethereum Tokens Explorer," available on or before Mar. 9, 2021, via Internet Archive: Wayback Machine URL<https://web.archive.org/web/20210309005642/https://ethplorer.io/>, retrieved on Mar. 15, 2024, URL<https://ethplorer.io/>, 3 pages.
International Preliminary Report on Patentability in International Appln. No. PCT/US2022/071898, mailed on Nov. 2, 2023, 8 pages.
International Preliminary Report on Patentability in International Appln. No. PCT/US2022/071901, mailed on Nov. 2, 2023, 8 pages.
Manyika et al., "The Internet of Things: mapping the value beyond the hype," McKinsey & Company, Jun. 2015, 24 pages.
Nimdzi.com [online], "THE 2021 NIMDZI 100: The Ranking of the Top 100 Largest Language Service Providers," 2021, retrieved on Mar. 15, 2024, retrieved from URL<https://www.nimdzi.com/nimdzi-100-2021/>, 37 pages.
Pourmajidi et al., "Logchain: Blockchain-assisted Log Storage," CoRR, submitted, May 22, 2018, arXivi:1805.08868V1, 5 pages.
Reuters.com [online], "Ethereum is top public blockchain, bitcoin No. 13 in China's new index," available on or before Mar. 9, 2019, via Internet Archive: Wayback Machine URL<https://web.archive.org/web/20190209011122/http://www.reuters.com/article/us-crypto-currency-index/ethereum-is-top-public-blockchain-bitcoin-no-13-in-chinas-new-index-idUSKCN1II2R9?feedType=RSS&feedName=businessNews&utm_source=feedburner&utm_medium=feed&utm_campaign=Feed%3A+reuters%2FbusinessNews+%28Business+News%29>, retrieved on Mar. 15, 2014, URL<https://www.reuters.com/article/us-crypto-currency-index/ethereum-is-top-public-blockchain-bitcoinno13-in-chinas-new-index-idUSKCN1II2R9>, 4 pages.
Schwartz et al., "Machine Translation and Monolingual Postediting: The AFRL WMT-14 System," Proceedings of the Ninth Workshop on Statistical Machine Translation, Jun. 26-27, 2014, pp. 186-194.
Slator.com [online], "Tag: neural machine translation," available on or before Mar. 6, 2021, via Internet Archive: Wayback Machine URL<https://web.archive.org/web/20210306144146/https://slator.com/tag/neural-machine-translation/>, retrieved on Mar. 15, 2024, URL<https://slator.com/tag/neural-machinetranslation/>, 9 pages.

* cited by examiner

EXFLUENCY

- Requester
- Redactor
- Enhancer
- Trust Miner

- My Profile
- My Trust Chain
- Reputation Boards
- My XFL
- My Companies
- My Gated Communities
- Community Help
- System Support
- Terms & Conditions
- ADMIN

- Sign out chess.odt | Search | ◉ Complete | ▼ ▲ | Finish Document

Szachy to dwuosobowa strategiczna gra planszowa rozgrywana na szachownicy, szachownica z 64 kwadratami ułożonymi w siatkę 8x8. Uważa się, że szachy pochodzą z indyjskiej gry chaturange, które kiedykolwiek przed 7 wieku wywodziły się z indyjskiej gry Gra nie obejmuje żadnych ukrytych informacji. Każdy gracz od 16 sztuk: jednego króla, jednej królowej, dwóch gawronów, dwóch biskupów i ośmiu pionków, Każdy typ elementu porusza się najpotężniejsza jest królowa i najmniej potężny pionek. Celem króla przeciwnika poprzez umieszczenie go pod nieuniknionym schwytania. W tym celu elementy gracza są używane do Nie obejmuje żadnych ukrytych informacji. Każdy gracz od 24 sztuk: jednego króla, jednej królowej, dwóch gawronów, dwóch biskupów i ośmiu pionków, Każdy typ elementu porusza się najpotężniejsza jest królowa i najmniej potężny pionek. Celem króla przeciwnika poprzez umieszczenie go pod nieuniknionym schwytania. W tym celu elementy gracza są używane do Obejmuje żadnych ukrytych informacji. Każdy gracz od sztuk: jednego króla, jednej królowej, dwóch gawronów, dwóch biskupów i ośmiu pionków, Każdy typ elementu porusza się najpotężniejsza jest królowa i najmniej potężny pionek. Celem króla przeciwnika poprzez umieszczenie go pod nieuniknionym schwytania. W tym celu elementy gracza są używane do Każdy typ elementu porusza się najpotężniejsza jest królowa i najmniej potężny pionek. Celem króla przeciwnika poprzez umieszczenie go pod nieuniknionym Remaining assets: 4/4 | Target Quality: Published | Due: 7 days ago | Est. time remaining 25 minutes

FIG. 9

FIG. 10 chess.odt

Search

Complete

1004

1002 wieku wywodzily sie z indyjskiej gry chaturanga.

Play involves no hidden information. Each player begins with 16 pieces, one king, one queen, two rooks, two knights, two bishops, and eight pawns. Each piece type moves differently, with the most powerful being the queen and the least powerful the pawn. The Gra nie obejmuje zadnych ukrytych informacji. Kazdy gracz od 16 sztuk: jednego kro.a, jednej krolowej, dwoch gawrony, dwoch biskupow i osmiu pionkow, Kazdy typ elementu porusza sie najpotezniejsza jest krolowa i najmniej potezny pionek. Celem krola przeciwnika poprzez umieszczenie go pod nieuniknionym schwytania. W tym celu elementy gracza sa uzywane do Nie obejmuje zadnych ukrytych informacji. Kazdy gracz od 24 sztuk: jednego kro.a, jednej krolowej, dwoch gawrony, dwoch biskupow i osmiu pionkow, Kazdy typ elementu porusza sie najpotezniejsza jest krolowa i najmniej potezny pionek. Celem krola przeciwnika poprzez umieszczenie go pod nieuniknionym schwytania. W tym celu elementy gracza sa uzywane Szachy sa rzadzone na arenie miedzynarodowej przez Swiatowa Szachow (FIDE; francuski; Federation internationale des echecs), organizuje Mistrzostwa Swiata w Szachach I Olimpiade Szachowa. Mistrzostwa swiata to mecz miedzy mistrzem a zawodnikiem przez cykl zawodow kwalifikacyjnych. Odbywa sie od 1886 roku, chociaz Finish Document

1000

EXFLUENCY
- Requester
- Redactor
- Enhancer
- Trust Miner

- My Profile
- My Trust Chain
- Reputation Boards
- My XFL
- My Companies
- My Gated Communities
- Community Help
- System Support
- Terms & Conditions
- ADMIN Sign out Remaining assets: 2/4 | Target Quality: | Published | Due: 7 days ago | Est. time remaining 11 minutes

Create Defined Term

Source Text: King

Definition: King on chessboard

[Cancel] [OK]

FIG. 12

Create Forbidden Phrase

Source Text: Mighty

Justification: Not Good for Translation

[Cancel] [OK]

FIG. 13

MATCHING SERVICE REQUESTER WITH SERVICE PROVIDERS

CROSS-REFERENCE TO RELATED APPLICATIONS

This application claims the benefits under 35 U.S.C. § 119(e) of U.S. Provisional Patent Application No. 63/178,766, entitled "Taxonomy Matching of Data Subject with Human Resource Skillset Nodes," filed Apr. 23, 2021, U.S. Provisional Patent Application No. 63/178,702, entitled "Computer Implemented Ledger for Quality Scores for Service Providers," filed Apr. 23, 2021, U.S. Provisional Patent Application No. 63/178,771, entitled "User Interface for Translation Editor," filed Apr. 23, 2021, U.S. Provisional Patent Application No. 63/178,704, entitled "Automated Translation Platform," filed Apr. 23, 2021, and U.S. Provisional Patent Application No. 63/178,707, entitled "Automated Anonymization of Personal Information," filed Apr. 23, 2021. The disclosures of the foregoing applications are incorporated herein by reference in their entireties for all purposes.

BACKGROUND

Translations of content from one language into another are performed by linguists, computer-assisted translation tools, or a combination of both. For instance, translation requesters can obtain translation services from a translation company, which acts as an intermediary agent between translation requesters and translation providers.

SUMMARY

Systems, methods, devices, and non-transitory, computer-readable storage media are disclosed for matching a service requester, such as a translation requester, with a service provider, such as a translation provider, via a taxonomy based directed graph. The directed graph can be used to identify a human resource with expertise in a specific area that the service is related to. For example, a list of ranked human translation resources that are capable of handling subject matter of a document to be translated can be identified based on the directed graph. The human translation resources can be ranked based on an immutable indication of past translation performance, such as a score record stored on a blockchain. The translation requester can select a translation provider from the list of ranked translation providers. In some implementations, the document is initially translated by machine translation and is then provided to the identified human translation provider for enhancement (e.g., revision or review).

In an aspect, a method includes: receiving, by one or more processors, a keyword associated with a service; accessing, by the one or more processors, a directed graph including a root node and nodes connected by edges, each node having a title, wherein the directed graph includes semantic paths, each semantic path being from the root node to a node having a title that at least partially matches the keyword, wherein the directed graph includes a first node having a title matching the keyword; identifying, by the one or more processors, a second node of the directed graph for each of service providers, each second node having a title matching a skill of a respective service provider; determining, by the one or more processors, a distance between the first node and each second node along the directed graph; and ranking, by the one or more processors, the service providers based at least in part on the distance between the first node and each second node.

Embodiments can include one or any combination of two or more of the following features.

In some implementations, the method further includes sending an indication of the ranked service providers to a requester of the service.

In some implementations, the method further includes identifying a third node of the directed graph for each of the service providers, each third node having a title indicating an identification (ID) of a respective service provider, wherein each third node is connected to the second node of the respective service provider.

In some implementations, each third node is connected to the second node of the respective service provider by an edge having a title indicating a language pair for the service.

In some implementations, the method further including generating the directed graph.

In some implementations, generating the directed graph includes: in a main directed graph that includes a main root node and main nodes connected by main edges, identifying one or more of the main nodes that each has a title that at least partially matches the keyword; determining a distance along the main directed graph from the main root node to each of the identified main nodes; selecting one or more of the identified main nodes based on the distance from the main root node to each identified main node; and generating the directed graph, wherein the selected main nodes are a plurality of nodes of the directed graph, each of the plurality of nodes having a title that at least partially matches the keyword.

In some implementations, the method further including selecting a predefined number of the identified main nodes.

In some implementations, the method further including generating the main directed graph based on a hierarchical classification of skills.

In some implementations, the method further including updating the main directed graph based on an update to a hierarchical classification of skills.

In some implementations, the method further including identifying the one or more of the main nodes using regular expressions.

In some implementations, the service is translation of a linguistic content from a first language to a second language, and the method further includes: obtaining a machine translation of the linguistic content of a document from the first language to the second language; and providing the translated linguistic content to one of the service providers for revision.

In some implementations, the method including ranking the service providers based at least in part on an indication of a capability of each service provider to provide a translation service from the first language to the second language.

In some implementations, the method including ranking the service providers based in part on a quality metric for each service provider.

In some implementations, the method including determining the quality metric for each service provider, wherein the quality metric for each service provider is based on a record for the service provider that is stored in a blockchain.

In an aspect, a computing system includes one or more processors coupled to a memory, the one or more processors configured to perform a method according to any of the aspects or embodiments described above.

In an aspect, a non-transitory computer readable medium stores instructions for causing a computing system to perform a method according to any of the aspects or embodiments described above.

Systems, methods, devices, and non-transitory, computer-readable storage media are further disclosed for determining and storing a quality score for the revised linguistic content (e.g., a document translated by machine translation that is to be revised by a human enhancer). The quality score for evaluating the quality of the revised linguistic content is stored in a blockchain, and is unalterable.

In an aspect, a method includes: receiving, by one or more processors, a linguistic content revised by a linguistic content enhancer; receiving, by the one or more processors and from a reviewer of the revised linguistic content, an indication of errors in the revised linguistic content; determining, by the one or more processors, a quality score for the linguistic content enhancer based on the received indication of the errors in the revised linguistic content; and storing, by the one or more processors, a record for the linguistic content enhancer in a blockchain, the record including the quality score for the revised linguistic content.

Embodiments can include one or any combination of two or more of the following features.

In some implementations, receiving the indication of errors in the revised linguistic content includes receiving an indication that there are no errors in the revised linguistic content. Determining the quality score for the linguistic content enhancer includes setting the quality score as a predefined value.

In some implementations, receiving the indication of errors in the revised linguistic content includes receiving an indication of one or more linguistic assets in the revised linguistic content that have errors. Determining the quality score for the linguistic content enhancer includes: for each linguistic asset that has an error, determining a quality score for the linguistic asset based on the respective error; determining an average quality score for the revised linguistic content based on the quality score for each linguistic asset; and setting the quality score for the linguistic content enhancer as the average quality score.

In some implementations, determining the quality score for the linguistic asset that has an error includes: determining an error value for the error based on a type of the error; and setting the quality score for the linguistic asset based on a difference between a predefined value and the error value.

In some implementations, the method further including: identifying a skill taxonomy of the revised linguistic content; and storing the skill taxonomy of the revised linguistic content in the record for the linguistic content enhancer stored in the blockchain.

In some implementations, the method further including: determining a timeliness of the revised linguistic content; and storing an indication of the timeliness of the revised linguistic content in the record for the linguistic content enhancer stored in the blockchain.

In some implementations, the method further including: identifying a skill taxonomy of the revised linguistic content; identifying the number of linguistic assets in the revised linguistic content; identifying an indication of a timeliness of the revised linguistic content; and storing the skill taxonomy of the revised linguistic content, the number of linguistic assets, and an indication of the timeliness of the revised linguistic content in the record for the linguistic content enhancer stored in the blockchain.

In some implementations, the method further including: receiving the linguistic content in a first language; obtaining a machine translation of the linguistic content into a second language; and providing the linguistic content in the second language to the linguistic content enhancer for revision.

In some implementations, the method further including: storing an identifier of the first language and an identifier of the second language in the record for the linguistic content enhancer stored in the blockchain.

In some implementations, the method including determining a characterization of the linguistic content enhancer based on the number of items of linguistic content revised by the linguistic content enhancer and based on the quality score for each of one or more items of linguistic content revised by the linguistic content enhancer.

In some implementations, determining the characterization of the linguistic content enhancer comprises applying a weighting function to the quality scores for items of linguistic content having an age that exceeds a threshold age.

In some implementations, the method further including enabling display, in a user interface, of a visualization of the characterization of the linguistic content enhancer.

The implementations described herein can provide one or more of the following benefits. In some implementations, a list of service providers (e.g., a list of human translation providers) can be automatically identified to match specific criteria specified by the service requester (e.g., a subject matter of linguistic content to be translated and a language pair for the translation) based on a taxonomy-based directed graph. The service requester can select a service provider from the list without an intermediary agency. Without an intermediary agency between the service requester and the service provider, transparency is improved, e.g., in that service requesters can select service providers based on the skills and reputation of each available service provider. In addition, costs can be reduced.

In some implementations, an indication of the quality of each service assignment (e.g., each translation enhancing assignment) completed by a service providersis stored in a blockchain, which is unalterable. A service requester can confidently select a service provider based on the immutable quality scores of available service providers, helping to ensure high quality services are received. In addition, the use of blockchain to store immutable quality scores rewards good performance and provides a secure and public ledger of reputation.

The details of one or more implementations are set forth in the accompanying drawings and the description below. Other features and advantages will be apparent from the description and drawings, and from the claims.

BRIEF DESCRIPTION OF DRAWINGS

FIG. 9 is an example user interface of a translation system for a linguistic content enhancer.

FIG. 10 is an example user interface of a translation system for a linguistic content enhancer.

FIG. 12 is an example user interface of a translation system.

FIG. 13 is an example user interface of a translation system.

Like reference numbers and designations in the various drawings indicate like elements. The components shown here, their connections and relationships, and their functions, are meant to be examples only, and are not meant to limit the implementations described and/or claimed in this document.

DETAILED DESCRIPTION

Figure 1:
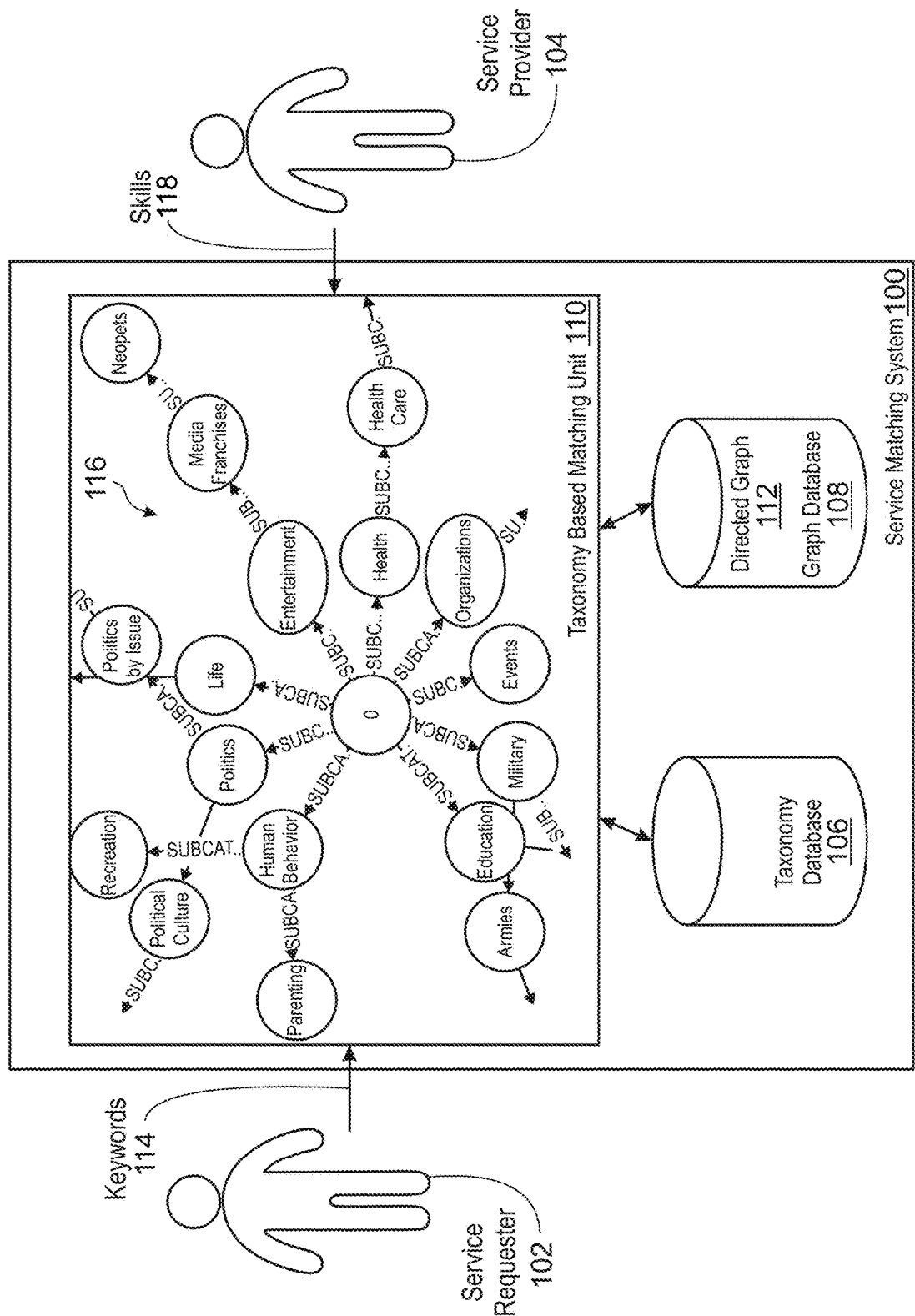
FIG. 1 is a block diagram of an example service matching system.

Systems, methods, devices, and non-transitory, computer-readable storage media are disclosed for matching a service requester with a service provider. In some implementations, a service requester (e.g., a translation requester) provides one or more keywords descriptive of a requested service (e.g., a translation service). The keywords indicate a subject matter of the service or one or more skills associated with the service (e.g., a skill pertaining to the subject matter of the content to be translated). Based on a taxonomy-based directed graph that categories service providers based on their skills, one or more service providers are identified that are qualified to provide the requested service. The identified service providers are ranked based on past performance as indicated by immutable quality indications for each service provider stored in a blockchain. The service requester can select a service provider from among the identified service providers and based on the ranking of the service providers.

A taxonomy-based directed graph includes a root node and other nodes connected by edges. A semantic path exists between the root node and each other node of the directed graph. Each node of the directed graph is associated with a descriptor, such as a title, that indicates a topic (sometimes referred to as a skill) represented by that node. The skill taxonomy (e.g., the skill associated with each node) becomes more specific along the semantic path outward from the root node (e.g., "Science" for the root node→"Scientific problems"→"Unsolved problems in biology"→"Aliments of unknown cause"→"Autoimmune diseases"→"Asthma"). When a service request is received, multiple nodes of the directed graph are identified based on the one or more keywords. For instance, one or more nodes of the directed graph that have at least a partial match between a descriptor (e.g., a title) of the node and one of the keywords are identified. A semantic path exists between each identified node and the root node of the directed graph (for instance, an identified node can be directly connected to the root node via an edge, or there can be one or more nodes between an identified node and the root node). A smaller directed graph is generated based on the identified nodes. In the smaller directed graph, the node at the end of each semantic path has a descriptor that at least partially matches one of the keywords, and one of the nodes has a title that matches (e.g., is the same as or substantially similar to) one of the keywords. For example, a translation requester provides a document to be translated, and the document has a keyword "Asthma." A directed graph is generated, in which one of the nodes is titled "Asthma." There are five nodes (a "Science" node, a "Scientific problems" node, an "Unsolved problems in biology" node, a "Aliments of unknown cause" node, and an "Autoimmune diseases" node) between the root node and the "Asthma" node along the semantic path, which shows a hierarchy from a general taxonomy to a specific taxonomy.

Each service provider is associated with one or more skills, e.g., previously provided upon enrollment into the service provider matching platform. Each skill matches with (e.g., the same as or similar to) the title of a node in the directed graph. A subset of the service providers are associated with skills that match nodes in the smaller directed graph. To identify service providers that are qualified to provide the requested service (e.g., service providers who are associated with skills that render the service providers capable to handle translation tasks related to the subject matter of the request), the distance along the smaller directed graph between the node matching the keyword and each node that matches a skill of a service provider is determined. The service providers are ranked according to that distance. The distance provides an indication of how well suited each service provider is to provide a service related to the keyword. For example, the keyword for a requested translation project is "Asthma," while a skill of a first service provider is "Autoimmune diseases" and a skill of a second service provider is "Unsolved problems in biology." The distance between "Asthma" and "Autoimmune diseases" is smaller than the distance between "Asthma" and "Unsolved problems in biology," and thus the first service provider ranks higher than the second service provider. As another example, the keyword is "Asthma," while a skill of a first service provider is "Asthma" (the same as the keyword) and a skill of a second service provider is "Unsolved problems in biology." The distance between "Asthma" and "Asthma" (the distance is zero) is smaller than the distance between "Asthma" and "Unsolved problems in biology," and thus the first service provider ranks higher than the second service provider. In some implementations, only service providers satisfying certain criteria are included in the ranking. For instance, when the requested service is a translation from a first language to a second language, only service providers that are qualified for work with that language pair are considered for the ranking.

In some implementations, a ranked list of service providers is provided to the service requester for selection. The service requester can select a service provider from the ranked list. In some implementations, the list of service providers is ranked based on a distance between the node having a title matching with (e.g., the same as or similar to) a particular keyword and the node having a title matching with (e.g., the same as or similar to) a skill of each service provider. In some implementations, the ranking of service providers is also based on one or more other parameters, e.g., price, an average quality score of history assignments, delivery timeliness rate, etc. Each parameter can be assigned a weight, a final ranking score can be calculated taking into account all the parameters, and the list of service providers can be ranked based on the final ranking score.

Systems, methods, devices, and non-transitory, computer-readable storage media are disclosed for determining and storing a quality score for the service provided by the service provider. The quality score that indicates the quality of service previously provided by the service provider is stored in a blockchain, and is unalterable. Each service provider can have multiple scores, each indicating the quality of a corresponding past project, and an overall quality score can be based on the scores for some or all of the service provider's past projects. In some implementations, when the service is a translation service, a document is translated initially by machine translation, and the machine translated document is then enhanced (e.g., revised or reviewed) by a service provider referred to as a linguistic content enhancer (a human). The enhanced document is further checked by a quality controller (either a human or implemented by hardware/software) to identify errors made by the linguistic content enhancer in enhancing the machine translated document. A score for the enhancement assignment for the linguistic content enhancer is assigned based on the number and type of errors identified by the quality controller. The quality score for each enhancement assignment is stored in the blockchain, which is unalterable. In some implementations, an overall quality score for a linguistic content enhancer is determined based on the quality scores of some or all of the enhancement assignments previously carried out by the linguistic content enhancer. In some implementations, the average quality score for a linguistic content enhancer can be determined specifically for each of one or more different taxonomies (categories). For example, an overall quality score associated with a "pet caring" category for a linguistic content enhancer can be determined based on quality scores of all the enhancement assignments carried out by that linguistic content enhancer for subject matter associated with the "pet caring" category. The service requester (e.g., a translation requester) can select a service provider (e.g., a translation enhancer or a linguistic content enhancer) based on the average quality score for each service provider.

FIG. 1 shows an example service matching system 100. The example service matching system 100 can match a service requester 102 with a best-fit service provider 104. In some implementations, the example service matching system 100 includes taxonomy database 106, graph database 108, and taxonomy based matching unit 110. The taxonomy database 106 and the graph database 108 can be local databases or cloud databases.

The taxonomy database 106 is used for storing skill categories (taxonomies), which can be retrieved from, e.g., publicly available categories, such as Wikipedia categories. Pseudocode can be employed for a harvesting algorithm to harvest publicly available categories and their relationships. The skill categorization is a hierarchical structure from a general category to more specific subcategories (for example, "Internet"→"Email"→"Internet mail protocols"→"Local Mail Transfer Protocol"). In some implementations, only some of a set of publicly available categories (e.g., Wikipedia categories) are retrieved and stored in the taxonomy database 106. For instance, no more than six levels of the hierarchical structure are stored in the taxonomy database 106.

The graph database 108 is used for storing a directed graph 112 (e.g., Neo4J, referred to as "main directed graph" 112) corresponding to a hierarchical classification of skill categories stored in the taxonomy database 106. Relationships among the categories are retained in the directed graph 112. The directed graph 112 includes a root node (a starting node) and a plurality of nodes connected by a plurality of edges. Each node is labeled with a title indicating a category or subcategory represented by the node, e.g., "Internet", "Email", "Internet mail protocols", "Local Mail Transfer Protocol", etc. Each edge is labeled with "SUBCATEGORY". The title of each node can be in any language, e.g., Spanish, Chinese, German, French, etc. The directed graph 112 includes multiple semantic paths, each starting from the root node and ending at a node having a title indicating a specific subcategory. There are one or more nodes between the root node and the ending node. The skill taxonomy becomes more specific along each path (e.g., Root node→"Science"→"Scientific problems"→"Unsolved problems in biology"→"Aliments of unknown cause"→"Autoimmune diseases"→"Asthma"; Root node→"Politics"→"Political culture"→"Animals in politics"→"United States presidential pets", etc.).

In some implementations, the main directed graph 112 can be updated based on an update to the hierarchical classification of skills. For example, if an additional level of hierarchical classification (more than six levels of the hierarchical structure) is stored in the taxonomy database 106, the main directed graph 112 will be updated to reflect the new additional level. For example, additional nodes and edges corresponding to the new level are added into the main directed graph 112.

The taxonomy based matching unit 110 is used for identifying a list of service providers 104 that are qualified to provide the service requested by the service requester 102. In some implementations, the service requester 102 provides one or more keywords 114 related to the requested service, e.g., indicating skills associated with the service. For instance, when the service is a translation service, the keywords can indicate a subject matter of the content for translation. The directed graph 112 is searched based on the keywords 114 provided by the service requester 102 to identify one or more nodes having titles that at least partially match one or more of the keywords. Searching the directed graph can be based on one or more of the following: keywords, regular expressions (regex), a parameterized number of shortest paths from the root node of the directed graph to matching nodes (taking into consideration multiple paths), union across all keywords, escaping an AND/OR problem with matching, representation of both semantic and structure, cypher queries, or other suitable approaches. A regular expression (shortened as regex or regexp, also referred to as rational expression) is a sequence of characters that specifies a search pattern in the text.

There is at least a partial match between the title of each identified node and one of the keywords 114. In addition, at least one node is identified that has a title that matches one of the keywords 114. A partial match between a title and a keyword means, e.g., that the title shares a phrase, word, or part of a word in common with the keyword. For instance, a node with the title "Olympic sports" is a partial match to a keyword "Olympic skiing." A match between a title and a keyword means, e.g., that the title of the node is the same as the keyword, other than minor variations such as singular/plural, verb tense, or part of speech. For instance, a node with the title "Pharmaceutical" is a match to a keyword "Pharmaceuticals."

Based on the identified nodes, the taxonomy based matching unit 110 generates a new directed graph 116, e.g., by extracting the identified nodes and corresponding edges from the directed graph 112. The new directed graph 116 includes one or more semantic paths, each path starting from the root node and ends at an identified node (there are one or more nodes between the root node and each identified node). As in the directed graph 112, the skill taxonomy of the new directed graph 116 becomes more specific along the path (e.g., Root node→"Entertainment"→"Media Franchises"→"Neopets"). Each service provider 104 is associated with one or more skills 118 (e.g., each service provider 104 has previously provided an identification of his/her skills 118 to the service matching system 100). At least one of the service providers 104 has a skill 118 that matches with the title of a node in the new directed graph 116. The distance between the node having a title matching with a keyword 114 and each node in the new directed graph 116 having a title matching with a skill 118 of a service provider 104 is determined and used to rank the service providers 104. For example, the keyword 114 is "Entertainment", while the skill 118 of the first service provider is "Media Franchises" and the skill 118 of the second service provider is "Neopets". The first service provider ranks higher, because the distance between "Entertainment" and "Media Franchises" (1) is smaller than the distance between "Entertainment" and "Neopets" (2).

The directed graph based matching approaches described here can be used to match service requesters with service providers for various types of services, e.g., translation service, human resources (HR) recruitment service, healthcare service, university application service, etc. In a specific example, a translation requester provides a document to be translated and one or more keywords 114 indicating a subject matter of the document. The service matching system 100 can identify a ranked list of translation providers whose skills match the one or more keywords 114. In another example, an HR manager provides one or more keywords 114 indicating criteria for candidates for an open position. The service matching system 100 can identify a ranked list of candidates whose skills match the one or more keywords 114. In another example, a patient provides one or more keywords 114 indicating the patient's symptoms or/and diseases. The service matching system 100 can identify a ranked list of physicians whose skills match the one or more keywords 114. In another example, a college candidate provides one or more keywords 114 indicating the candidate's target characteristics (majors, courses, etc.) for a university. The service matching system 100 can identify a ranked list of universities having a major or course matching the one or more keywords 114.

The taxonomy based directed graph approach can match a service requester with a ranked list of service providers, so that the service requester can select a well suited service provider from the list. This approach facilitates identification of best-fit human resources (e.g., translation enhancers, candidates, physicians) by using a subject-matter hierarchy linked to specific skill nodes. For instance, for identification of a best-fit human resource, the taxonomy based matching unit 110 identifies a node that matches a keyword associated with the service, and then identifies a service provider having a skill that is close, according to the taxonomy, to the specific keyword for the service. As an example, the taxonomy based matching unit 110 can identify a skill node as specific as, e.g., "Diabetic Kidney Disease," rather than more generic skill areas such as "Engineering" or "Biology." Furthermore, the directed graph 112 can incorporate a wide range of skills or topics, and are extendable and modifiable as additional information, categories, etc., are developed or received.

Figure 2:
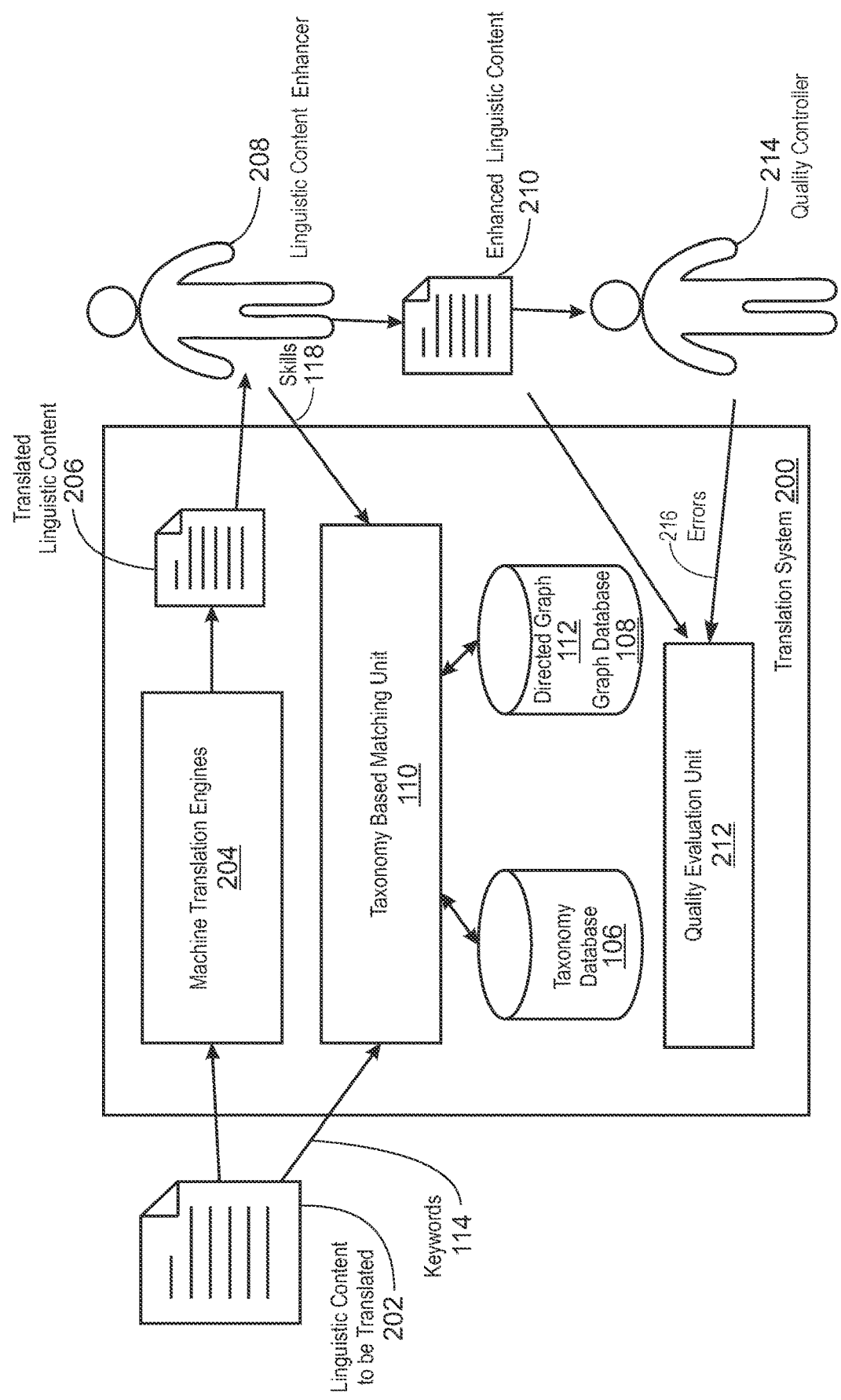
FIG. 2 is a block diagram of an example translation system.

FIG. 2 is a block diagram of an example translation system 200. In some implementations, the example translation system 200 includes one or more machine translation engines 204, a taxonomy based matching unit 110, and a quality evaluation unit 212. A translation service requester provides linguistic content to be translated 202 to the translation system 200. The linguistic content to be translated 202 can be a document, and the translation service requester provides (e.g., uploads) the content to the translation system 200. In some implementations, the linguistic content to be translated 202 can be directly copied/pasted to the translation system 200. The linguistic content to be translated 202 is translated by one or more machine translation engines 204 (e.g., Google® machine translator, Amazon machine translator, etc.) to generate translated linguistic content 206. In some examples, the content to be translated 202 is anonymized or redacted prior to machine translation to ensure that confidential or personal information is not provided to unauthorized users. Approaches to automated anonymization and redaction are described in U.S. patent application Ser. No. 17/728,561, filed Apr. 25, 2022, the contents of which are incorporated here by reference in their entirety.

One or more keywords 114 indicating a subject matter or topic of the linguistic content to be translated 202 are provided to the taxonomy based matching unit 110. The keywords 114 can be supplied by the requester or identified automatically, e.g., extracted from the linguistic content based on an automated analysis of the content. In an example, the graph database 108 is a Neo4J Graph Database. The keywords 114 associated with the linguistic content to be translated 202 include "defunct", "pets", "training". The graph database 108 is queried with a cypher query including these keywords 114.

The taxonomy based matching unit 110 uses the directed graph 112 to identify one or more linguistic content enhancers 208 to enhance (e.g., revise or review) the translated linguistic content 206. Each of the identified linguistic content enhancers 208 has a language capability that matches with a language pair (e.g., French to British English, Danish to German, etc.) of the requested translation service. Enhancing translated linguistic content involves correcting errors in the machine translated content 206, rephrasing the machine translated content 206 for readability or for a more natural feel, or other enhancements/revisions. The enhanced linguistic content 210 enhanced by the linguistic content enhancer 208 is provided to a quality controller 214 (a human or implemented by hardware/software) for review. The quality controller 214 can identify errors 216 (if any) in the enhanced linguistic content 210. The enhanced linguistic content 210 and the identified errors 216 are provided to a quality evaluation unit 212, which determines a quality score for the enhancement assignment (e.g., enhanced linguistic content 210) of the linguistic content enhancer 208 based on the errors 216.

In some implementations, the ability to identify human resources (e.g., translators or enhancers) based on fine-grained taxonomic categorization of skills can be useful for the processing of healthcare data, e.g., for translation of healthcare data. Healthcare translations often suffer from a translator's ignorance of the specifics of the healthcare field of use, e.g., the therapeutic area. The ability to objectively identify a list of human resources that is well-matched to a particular translation assignment related to a narrowly defined subject area can help improve the quality of the translation assignment.

Specifically, a new directed graph is generated based on the directed graph 112 and the keywords associated with the linguistic content to be translated. Nodes in the directed graph 112 that have titles at least partially matching one or more of the keywords are identified and a new directed graph is generated with these nodes.

Figure 3A:
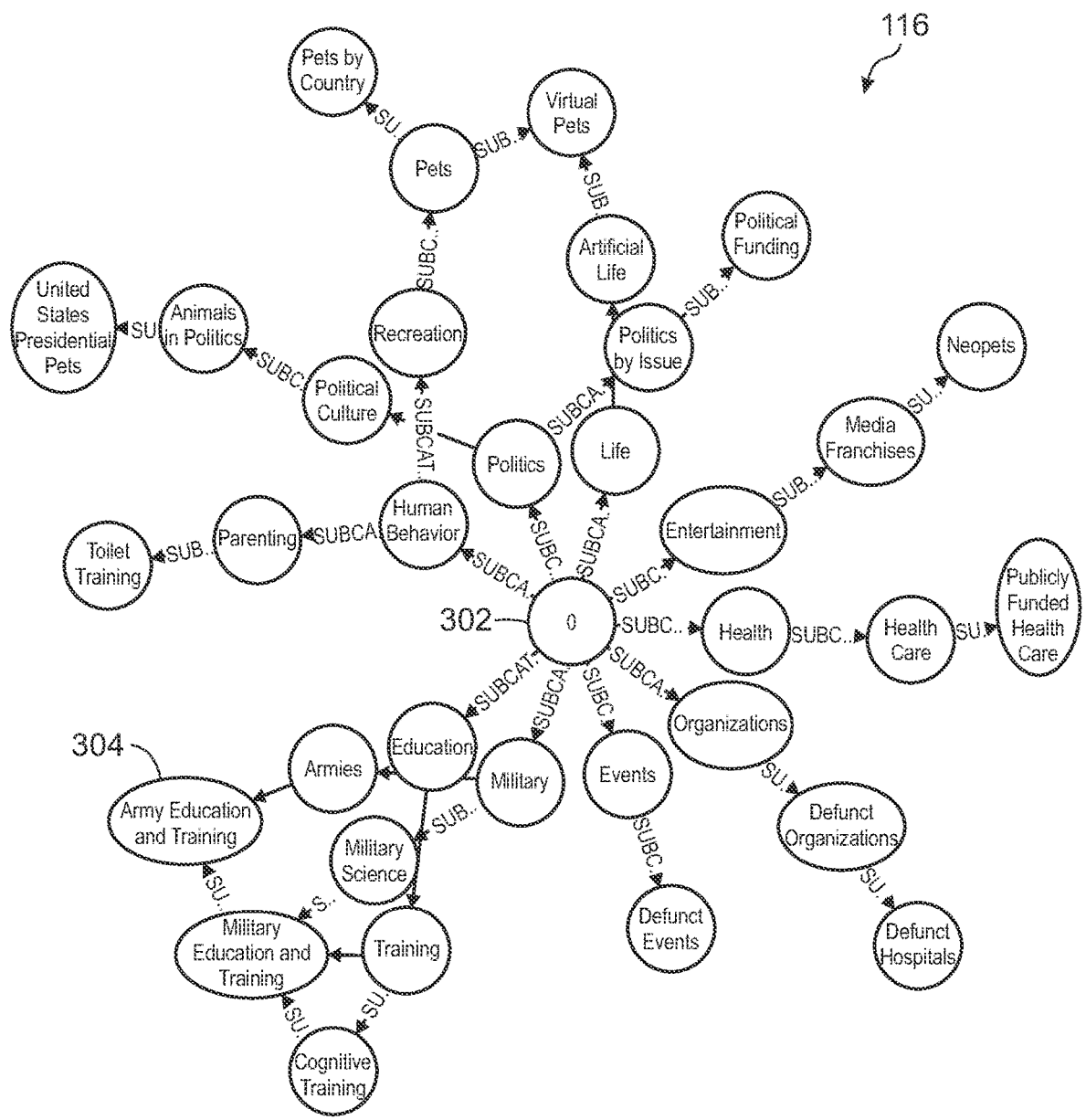
FIG. 3A is a diagram of an example directed graph.

In a specific example, the keywords associated with the linguistic content to be translated include "defunct," "pets," and "training." The taxonomy based matching unit 110 identifies all of the nodes in the directed graph 112 that have a title at least partially matching with one or more of these keywords. For example, the node "Cognitive training" in the directed graph 112 partially matches the keyword "training," and the node "Training" matches the keyword "training." The node "Neopets" alsopartially matches with the keyword "pets". As shown in FIG. 3A, the taxonomy based matching unit 110 generates a new directed graph 116 including these identified nodes.

In some implementations, less than a predetermined number of (e.g., less than five) nodes are identified for each keyword. For example, five nodes "Toilet training", "Army education and training", "Military education and training", "cognitive training", "Training" are identified corresponding to the keyword "training". Five nodes "Defunct events", "Defunct organizations" "Defunct hospitals", "Defunct health care", "Defunct political party" are identified corresponding to the keyword "defunct". Five nodes "Virtual pets", "Neopets", "Pets", "United States presidential pets", "Pets by country" are identified corresponding to the keyword "pets".

In some implementations, there are multiple semantic paths from the root node 302 to each identified skill node in the new directed graph 116. The shortest semantic path reflecting the most straightforward relationship is selected among the multiple semantic paths. For example, there are four semantic paths from the root node 302 to the skill node "Army education and training" 304, i.e., "Root node"→"Education"→"Training"→"Cognitive training"→"Military education and training"→"Army education and training"; "Root node"→"Education"→"Training"→"Military education and training"→"Army education and training"; "Root node"→"Military"→"Armies"→"Army education and training"; "Root node"→"Military"→"Military science"→"Military education and training"→"Army education and training". The shortest semantic path (that includes the fewest skill nodes along the semantic path), i.e., "Root node"→"Military"→"Armies"→"Army education and training", is selected among the four semantic paths.

Figure 3B:
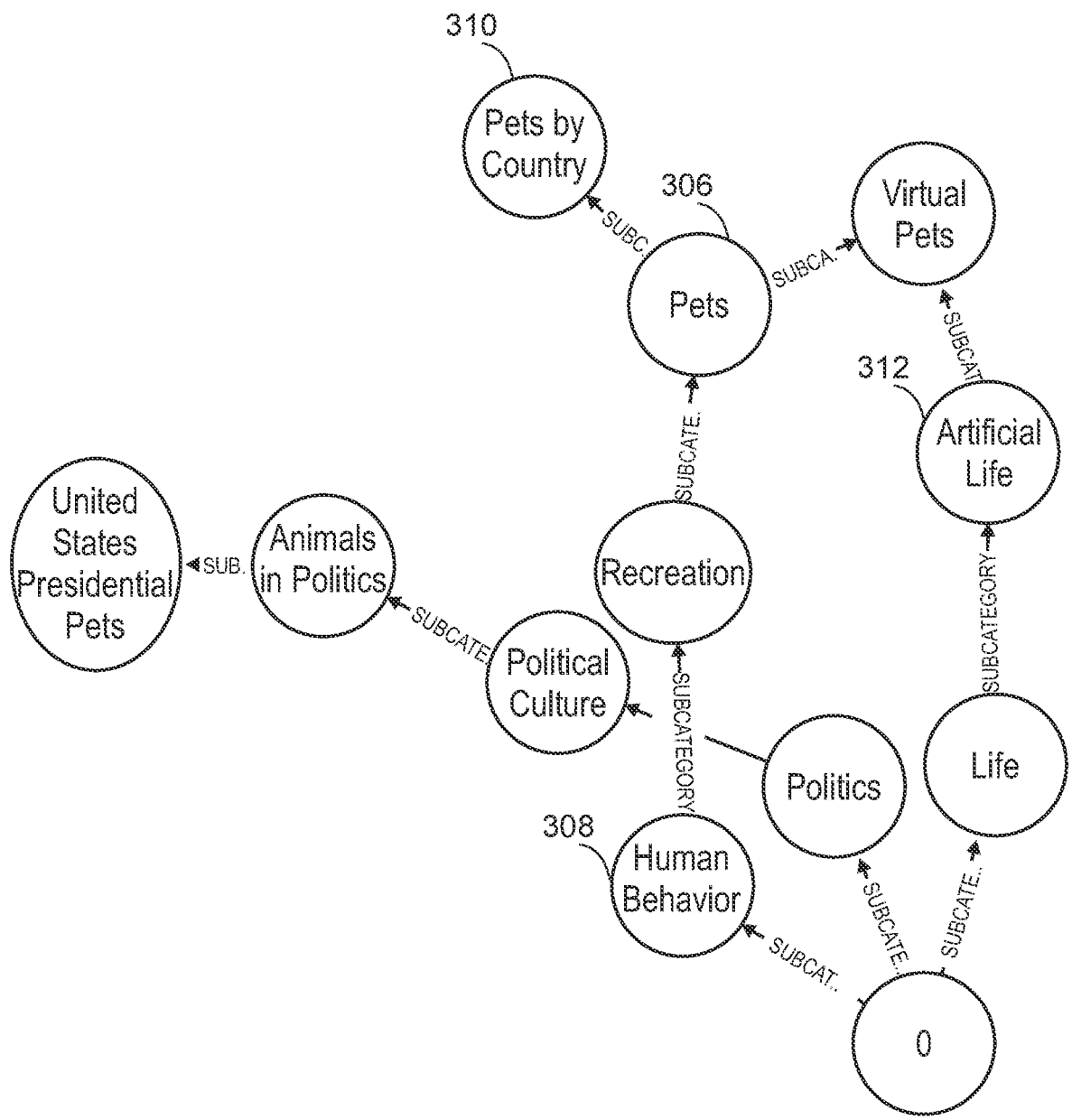
FIG. 3B is a diagram of an example directed graph that is a part of the example directed graph of FIG. 3A.

In some implementations, linguistic content enhancers 208 that are capable of handling a translation of subject matter characterized by the keywords are identified based on the new directed graph. FIG. 3B is a part of the example directed graph of FIG. 3A, reflecting a relationship between the keyword "pets" and multiple linguistic content enhancers 208. As shown in FIG. 3B, the node 306 has a title the same as the keyword "pets". The first linguistic content enhancer has a skill "Human behavior", which is the same as the title of the node 404; the second linguistic content enhancer has a skill "Pets by country", which is the same as the title of the node 310; the third linguistic content enhancer has a skill "Artificial life", which is the same as the title of the node 312. The nodes 306, 308, and 310 are on the same semantic path to the root node 0, while the node 312 is on a different semantic path. The distance along the directed graph between the node 310 and the node 306 is smaller than the distance between the node 308 and the node 306. Accordingly, the second linguistic content enhancer corresponding to the node 310 ranks higher than the first linguistic content enhancer corresponding to the node 308. The node 312 and the node 306 are on different semantic paths, and the distance between the node 312 and the node 306 can be considered as infinity. Accordingly, the first linguistic content enhancer corresponding to the node 308 ranks higher than the third linguistic content enhancer corresponding to the node 312. The ranked list of the three linguistic content enhancers is provided as: the second linguistic content enhancer, the first linguistic content enhancer, and the third linguistic content enhancer (in order of high ranking to low ranking).

Figure 4:
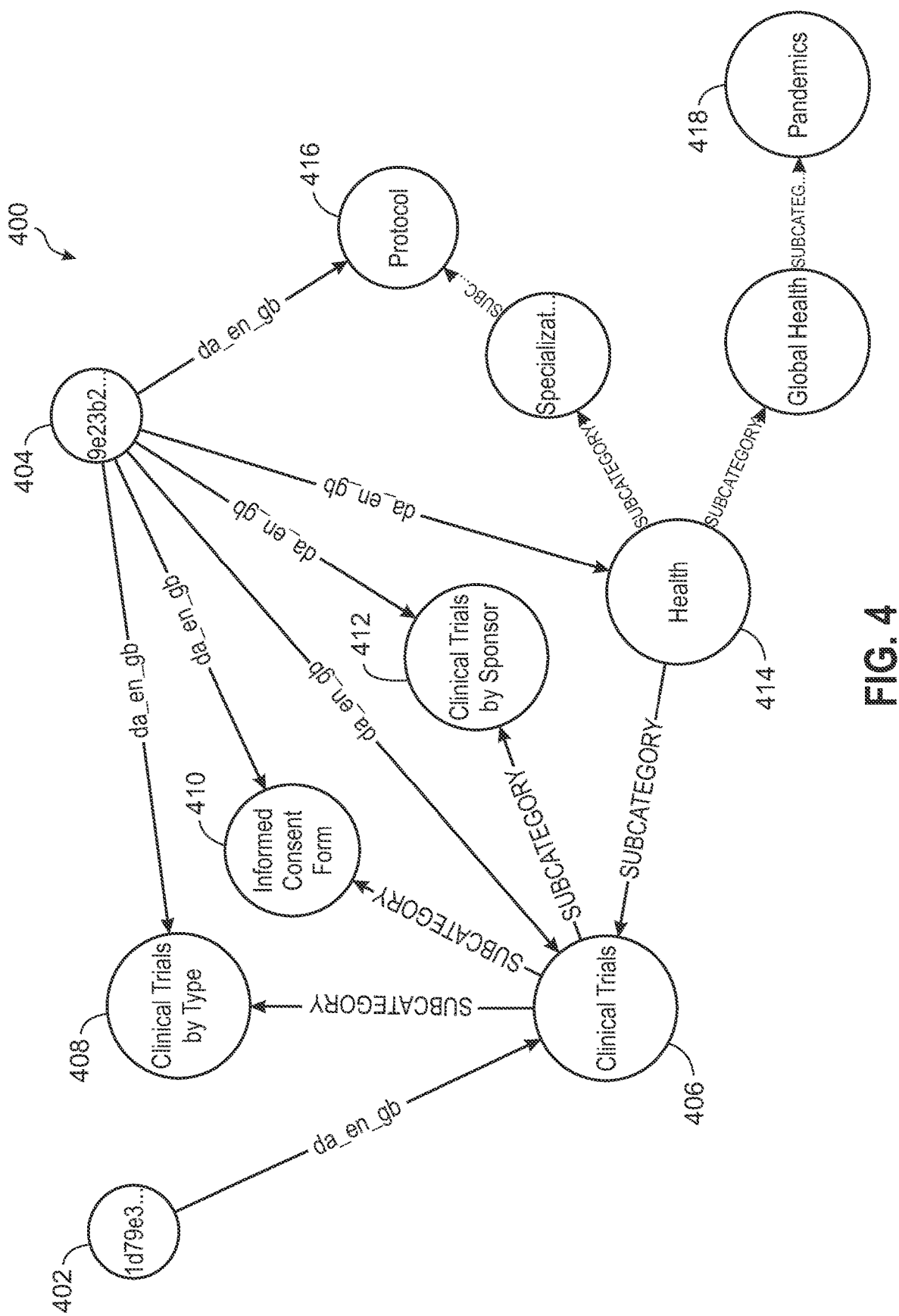
FIG. 4 is a diagram of an example directed graph.

FIG. 4 is a diagram of another example directed graph 400. In an example, a document with a subject (keyword) of "Pandemics" is to be translated from Danish to British English. In addition to nodes representing skills that are a part of the directed graph 112, the example directed graph 400 further includes nodes representing linguistic content enhancers, e.g., a node 402 representing a first linguistic content enhancer, and a node 404 representing a second linguistic content enhancer. The node 402 is labeled with an enhancer identification (ID) "1d79e3", while the node 404 is labeled with an enhancer ID "9e23b2". The first linguistic content enhancer and the second linguistic content enhancer are presented with a user interface to select their skills. The first linguistic content enhancer selects "Clinical trials", which matches with the title of the node 406. The second linguistic content enhancer selects "Protocol", "Health", "Clinical trials by sponsor", "Clinical trials", "Informed consent form" and "Clinical trials by type", which match with the node 416, the node 414, the node 412, the node 406, the node 410, and the node 408, respectively. Edges are generated between the node for each linguistic content enhancer and the skill nodes having titles that correspond to the skills of the linguistic content enhancer. The edges are labeled with the language pair(s) in which the linguistic content enhancer is capable of working. For instance, the edge between the node 402 representing the first linguistic content enhancer and the node 406 titled "Clinical trials" is labeled with "da_en_gb", indicating Danish to British English translation. Similarly, the edge connecting the node 404 and the node 408, the edge connecting the node 404 and the node 410, the edge connecting the node 404 and the node 412, the edge connecting the node 404 and the node 414, and the edge connecting the node 404 and the node 416 are all labeled with "da_en_gb".

The keyword "Pandemics" provided by the translation service requester matches with the title of the node 418. The taxonomy based matching unit 110 identifies the shortest path between each enhancer's skill node and the node 418 having a title the same as the keyword "Pandemics". The shortest path for the first linguistic content enhancer "1d79e3" is: "Clinical trials"→"Health"→"Global health"→"Pandemics". There are two nodes between the node 406 and the node 418. The shortest path for the second linguistic content enhancer "9e23b2" is: "Health"→"Global health"→"Pandemics". There is only one node between the node 414 and the node 418. The distance between the node 406 and the node 418 is larger than the distance between the node 414 and the node 418. The smaller the distance, the better the match between a linguistic content enhancer and the document to be translated. The linguistic content enhancer "9e23b2" is a better match than the linguistic content enhancer "1d79e3". In some implementations, linguistic content enhancers with the same distance are considered to be equally skillful for the document to be translated.

Service providers (e.g., linguistic content enhancers) identified via the taxonomy as represented by the directed graph are ranked and presented to the service requester for selection. The ranking is based on the distance to the nodes matching the keywords of the requested service. The ranking can also be based on other parameters, such as an indication of the quality of past assignments, timeliness, cost, or other parameters.

Figure 5:
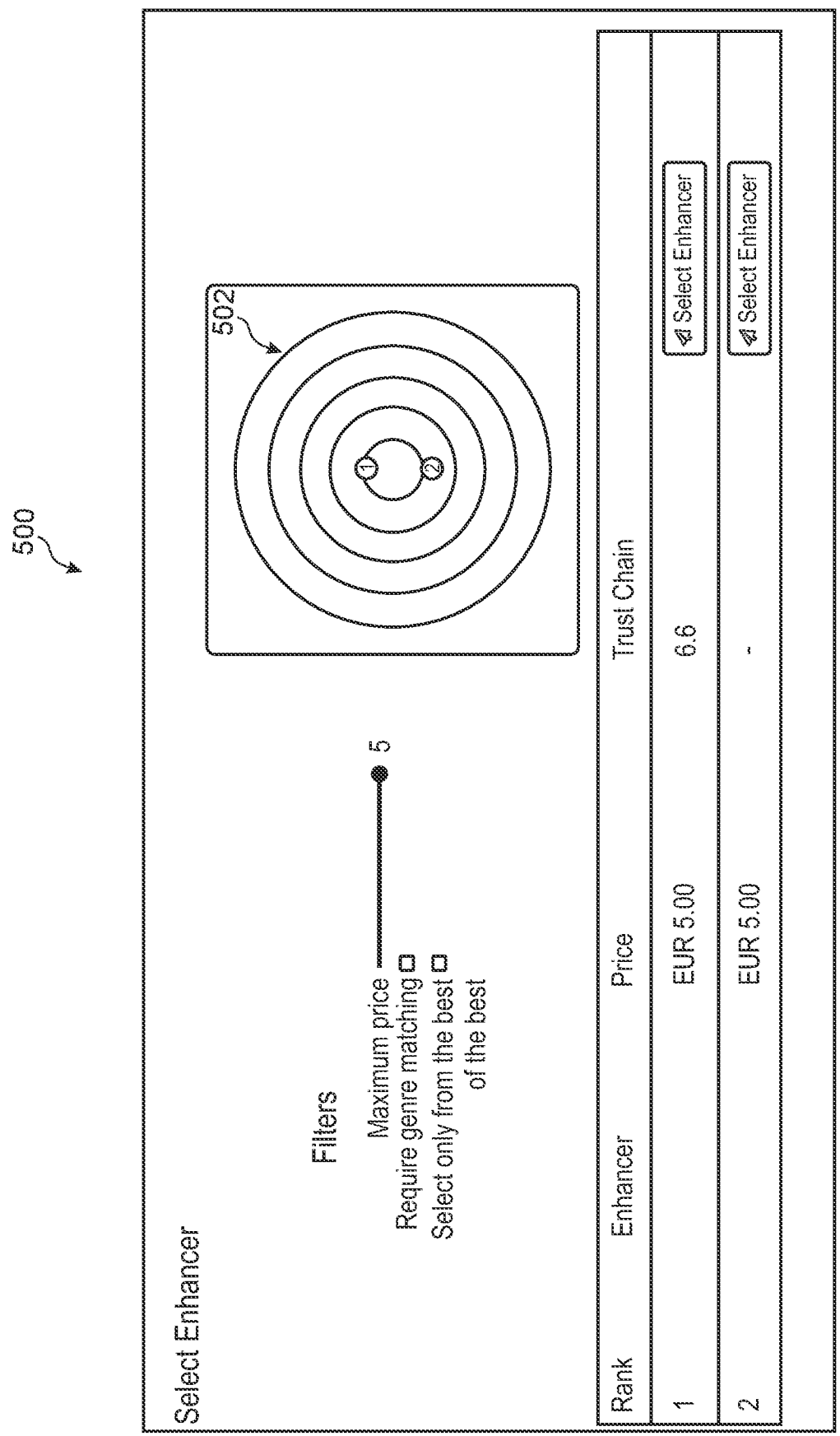
FIG. 5 is a diagram of an example user interface for selecting a linguistic content enhancer.

FIG. 5 is a diagram of an example user interface 500 that is presented to a service requester for selecting a linguistic content enhancer 208. In some implementations, as illustrated in FIG. 3B and FIG. 4, the list of linguistic content enhancers is ranked based on the distance along the directed graph between the node having a title matching a keyword and the node having a title matching a skill of each linguistic content enhancer (or the node that directly represents each linguistic content enhancer). In some implementations, the list of linguistic content enhancers can be ranked based on one or more parameters, e.g., price, an average quality score of history assignments ("Trust Chain" as shown in FIG. 5), assignment delivery timeliness rate, etc., in addition to the distance between the node having a title matching with a keyword and the node having a title matching with a skill of each linguistic content enhancer. Each parameter can be assigned a weight, a final ranking score can be calculated taking into account all the parameters, and the list of service providers can be ranked based on the final ranking score. As shown in FIG. 5, the linguistic content enhancer 1 and the linguistic content enhancer 2 are listed on the user interface 500 for the translation requester, and ranked based on, e.g., the final ranking score. In an example, the linguistic content enhancer 1 ranks higher than the linguistic content enhancer 2, and the ranking can be reflected, e.g., in the form of a target 502. The linguistic content enhancer 1 is closer to the center of the target 502 than the linguistic content enhancer 2. The translation requester can select a linguistic content enhancer, for example, based on the ranking, or other parameters, e.g., price or/and an average quality score of history assignments (previously completed assignments) or/and assignment delivery timeliness rate.

Figure 6:
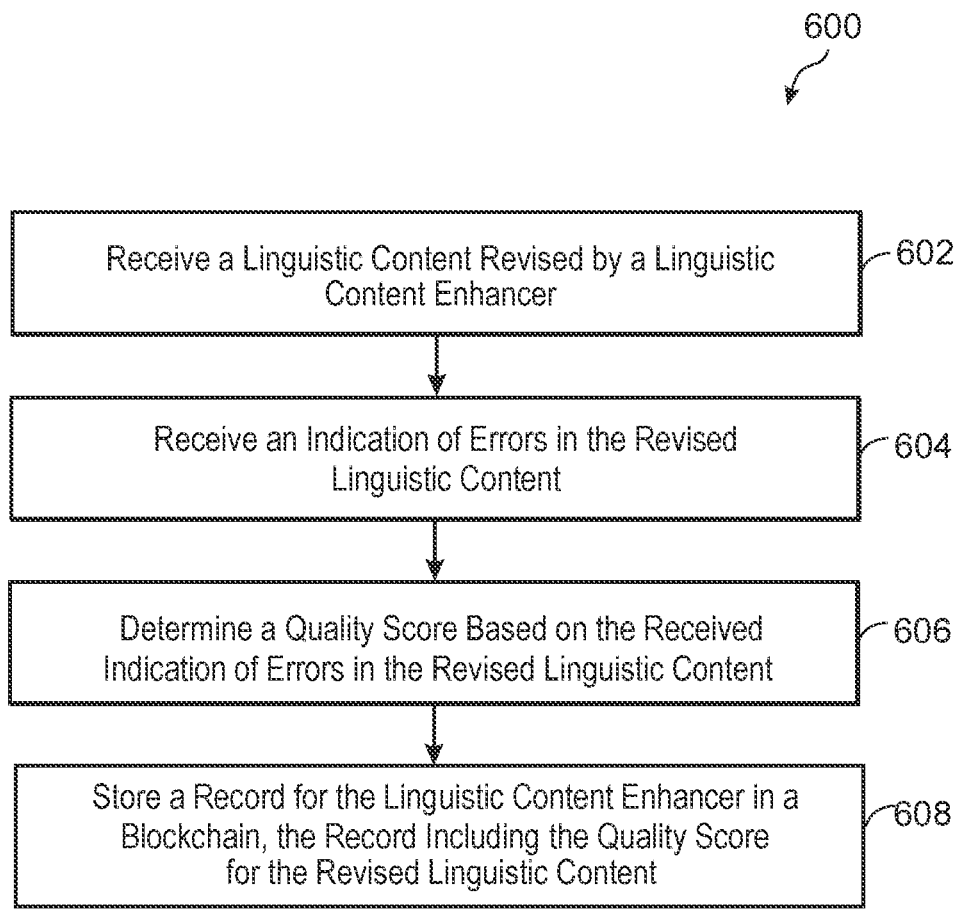
FIG. 6 is a flow chart of an example method of storing a quality score for a linguistic content enhancer in a blockchain.

FIG. 6 is a flow chart of an example method 600 of storing a quality score for a linguistic content enhancer in a blockchain. The linguistic content enhancer 208 enhances (e.g., revises) linguistic content (602). In some implementations, the linguistic content enhancer 208 receives a machine-translated document from the machine translation engines 204. The linguistic content enhancer 208 reviews the translated document (linguistic content) and enhances the translated document. For example, the linguistic content enhancer 208 can correct errors in the translated document, can rephrase words or phrases in the document for readability or for a more natural feel, or can make other appropriate revisions. The enhanced document is provided to a quality controller 214 for further review. The quality controller 214 identifies errors in the enhanced linguistic content (604), e.g., mistranslations, spelling or grammatical errors, phrases that do not sound natural, or other errors. The quality evaluation unit 212 determines a quality score for the enhanced linguistic content based on the errors identified by the quality controller 214 (606). A record for the linguistic content enhancer 208 is stored in a blockchain, and the record includes the quality score for the enhanced linguistic content (608). Any records stored in the blockchain are unalterable, and thus the quality scores for the linguistic content enhancers are trustworthy and not subject to manipulation. Thus, the translation service requester can select a linguistic content enhancer based on quality scores stored in the blockchain with trust.

The blockchain is utilized to form an immutable ledger of a reputation for each linguistic content enhancer. This ledger helps to ensure that an appropriate linguistic content enhancer, e.g., a bilingual linguistic content enhancer, in a given field and for a given language pair, is matched with the content of a particular translation assignment. The blockchain based approaches described here are personal, immutable, and specific to a given combination of languages (a language pair) and skills. In addition, a linguistic content enhancer is able to directly and immediately influence his/her ability to be awarded further work. Via the immutable ledger of linguistic performance, linguistic content enhancers are furnished with the opportunity to acquire an incontrovertible reputation. Accordingly, the translation service requester can trust that an appropriate linguistic content enhancer will be matched to any given translation assignment.

Figure 7:
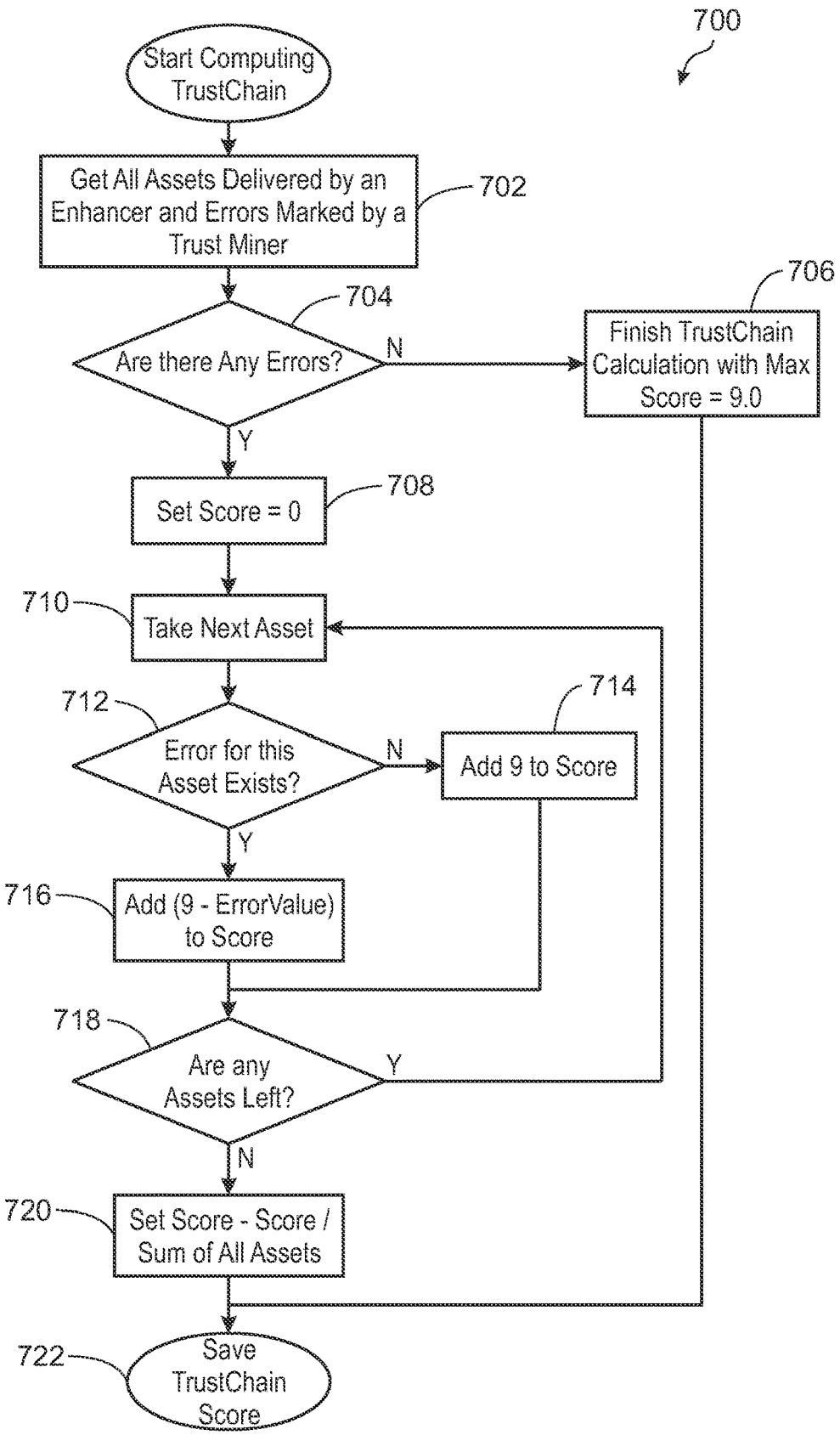
FIG. 7 is a flow chart of an example method of determining a quality score for revised linguistic content.

FIG. 7 is a flow chart of an example method 700 of determining a quality score for an enhancement assignment of the linguistic content enhancer 208. At step 702, the linguistic content enhancer 208 provides the enhanced linguistic content including linguistic assets, and the quality controller 214 identifies errors (if there are any errors) in the linguistic assets. A document including a plurality of linguistic assets is enhanced by the linguistic content enhancer 208. The enhanced document is further checked by a quality controller to identify potential errors made by the linguistic content enhancer. The linguistic assets can be a word, a phrase, a sentence, a plurality of sentences, a paragraph, a plurality of paragraphs, etc. The linguistic assets can be stored in a local database or cloud database, and can be reused for future translation assignments. For example, machine translation engines 204 may retrieve one or more linguistic assets from a database where the linguistic assets were stored, and reuse the one or more linguistic assets for future assignments related to a similar subject matter or topic.

At step 704, if there are no errors identified by the quality controller, at step 706, the highest quality score (e.g., a quality score of 9) is provided for this enhancement assignment completed by the linguistic content enhancer 708. If there are errors identified by the quality controller, at step 708, the quality score of this assignment is temporarily set as the lowest quality score (e.g., a quality score of 0).

If there are errors identified by the quality controller, subsequent to step 708, each linguistic asset of the document is checked one by one sequentially. At step 710, a particular linguistic asset is selected. The linguistic asset is selected sequentially.

At step 712, if there are no errors in the particular linguistic asset, at step 714, the highest quality score (e.g., a quality score of 9) is provided for this linguistic asset. If there are one or more errors in this linguistic asset, at step 716, a difference between the highest quality score and one or more error values (a quality score=the highest quality score−one or more error values) is provided for this linguistic asset. The error values are determined based on a type of each error (e.g., an error value of "word meaning lost" is "6", an error value of "spelling error" is "4", an error value of "grammar error" is "4", etc.).

At step 718, if there are any unchecked linguistic assets, the process 700 returns to the step 710 to select the next linguistic asset. If all the linguistic assets are checked, at step 720, the final quality score for this enhancement assignment is an average score of all the linguistic assets.

At step 722, the quality score (either the highest quality score at step 706 or an average score of all the linguistic assets at step 720) for each enhancement assignment is stored in the blockchain, which is unalterable.

In some implementations, an average quality score for a linguistic content enhancer can be determined based on quality scores of all the enhancement assignments. In some implementations, the average quality score for a linguistic content enhancer can be also determined for different taxonomies or categories. For example, an average quality score associated with pet caring for a linguistic content enhancer can be determined based on quality scores of all the enhancement assignments associated with pet caring. The service requester 102 (e.g., a translation requester) can select a service provider 104 (e.g., a linguistic content enhancer 208) based on the average quality score for the linguistic content enhancer 208.

Figure 8:
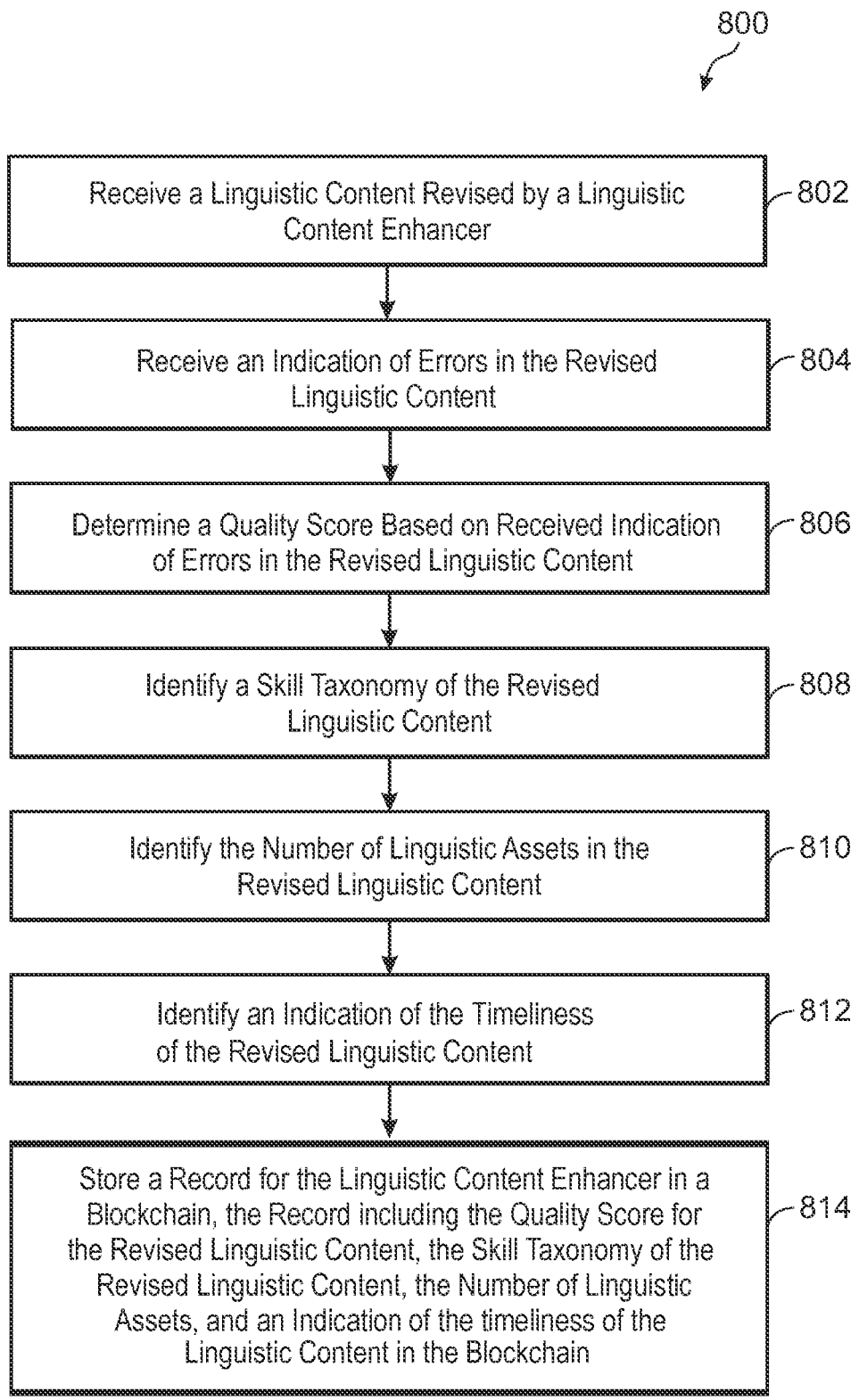
FIG. 8 is a flow chart of an example method of storing parameters of revised linguistic content in a blockchain.

FIG. 8 is a flow chart of an example method 800 of storing a characterization of the quality of a linguistic enhancer's performance in an enhancement assignment in a blockchain. The steps 802-806 are the same as the steps 602-606. The process 800 identifies a skill taxonomy of the linguistic content enhanced by the linguistic content enhancer 208 (808). In some implementations, the skill taxonomy matches a node of the directed graph 112. For example, the skill taxonomy (e.g., "Local Mail Transfer Protocol") is the same as the title of a node of the directed graph 112.

The process 800 identifies the number of linguistic assets in the enhanced linguistic content (810). In some implementations, a linguistic asset can be a paragraph of a document (linguistic content). In some implementations, a linguistic asset can be one or more words, e.g., a title or subtitle of the document.

The process 800 further identifies an indication of timeliness of the enhanced linguistic content (812). The process 800 identifies whether the linguistic content enhancer 208 completed this enhancement assignment in a timely manner by the due date.

The process 800 stores a record for the linguistic content enhancer 208 in a blockchain, and the record includes a plurality of parameters including the quality score for the enhanced linguistic content, a skill taxonomy of the linguistic content, the number of linguistic assets, and an indication of timeliness of the enhanced linguistic content (814). In some implementations, the plurality of parameters can further include a language pair (e.g., Chinese to English, French to German, etc.) of the enhancement assignment, the receipt date of the enhancement assignment, and the submission date of the enhancement assignment, etc. Any records stored in the blockchain are unalterable. Thus, the translation service requester can select a linguistic content enhancer based on the plurality of parameters stored in the blockchain with trust.

The quality scores (or an average quality score) and the number of assignments that the linguistic content enhancer 208 performed (or the number of linguistic assets that the linguistic content enhancer 208 corrected or enhanced) can be presented to the translation service requester in various visualizations for selection. In some implementations, the records of the linguistic content enhancer 208 can be presented as a histogram. The height of each bar is the total number of linguistic assets that the linguistic content enhancer 208 corrected or enhanced associated with a particular taxonomy node. The color of each bar can represent a quality score or quality rating (poor, medium, high) of the enhanced linguistic assets associated with the particular taxonomy node. For example, the color green represents high quality rating, the color yellow represents medium quality rating, and the color red represents low quality rating.

In some implementations, the records of the linguistic content enhancer 208 can be presented as bubbles. The size of each bubble represents the number of assignments that the linguistic content enhancer 208 performed associated with the particular taxonomy node, and the color and smiley displayed on each bubble represent the quality score or quality rating of the enhanced linguistic assets associated with the particular taxonomy node. For example, a large and green bubble (with a happy smiley) indicates that the linguistic content enhancer 208 completed a large number of assignments associated with the particular taxonomy node with high quality; a small and green circle (with a happy smiley) indicates that the linguistic content enhancer 208 completed a few assignments associated with the particular taxonomy node with high quality; and a large and red circle (with a sad smiley) indicates that the linguistic content enhancer 208 completed a large number of assignments associated with the particular taxonomy node with poor quality.

In some implementations, the linguistic content enhancer 208 has a relatively long history of quality scores (quality) and the number of assignments (quantity). To reflect recent performance of the linguistic content enhancer 208, a weighting function (e.g., an erosion function e(a)) can be used to remove the assignments or linguistic assets having an age that exceeds a threshold age. For example, the erosion function e(a) yields "1" for recent assignments (within a threshold age, e.g., less than one year) and "0" for old assignments (exceeding a threshold age, e.g., over one year).

FIG. 9 is an example user interface 900 of the translation system 200 for a linguistic content enhancer 208. The machine translated document is provided on the user interface 900. The linguistic content enhancer 208 can enhance the translation performed by machine translation engines 204. The linguistic content enhancer 208 can review each paragraph of the translated document, and correct any incorrectly translated words or phrases. For example, a document was translated by machine translation engines 204 from a source language (e.g., French) to a target language (e.g., Danish), and provided to the linguistic content enhancer 208 for revision or enhancement.

The translated document is presented to the linguistic content enhancer 208 in the target language (e.g., Danish), but not in the source language. The presentation of only the target language makes it easier for the linguistic content enhancer 208 to review.

The translation system 200 presents translated texts in a monolingual user interface 900. On average, the linguistic content enhancers 208 (reviewers) change a few words (e.g., just 14 out of every 100 words) with which they are presented, and thus it is unnecessary to see the source language all the time—though it is available if desired. The user interfaces of the translation system 200 allow enhancers to enhance as much as three times the amount of text as that achieved in traditional translation tools. The user interfaces of the translation system 200 thus empower bilingual linguistic content enhancers 208 to leverage their language skills in specific, technical content areas. Presentation of content only in the target language is possible because the starting point for human interaction is the machine translated content. In some examples, accuracy of the machine translation is enhanced by relying on and recycling stored assets, as described in U.S. application Ser. No. 17/728,561, filed Apr. 25, 2022, the contents of which are incorporated here by reference in their entirety.

FIG. 10 is another example user interface 1000 of the translation system 200 for a linguistic content enhancer 208. If the linguistic content enhancer 208 identified possible errors of a paragraph of the machine translation 1002 in a target language (e.g., French), the user interface 1000 can present the source language (e.g., French) of this paragraph 8041004, so that the linguistic content enhancer 208 can investigate the identified possible errors and determine whether a revision is appropriate.

Figure 11:
FIG. 11 is an example user interface of the translation system for a translation quality controller.

FIG. 11 is an example user interface 1100 of the translation system 200 for a translation quality controller. The enhanced document from the linguistic content enhancer 208 is provided on the user interface 1100. The translation quality controller can enhance the translation performed by the linguistic content enhancer 208. The translation quality controller can review each paragraph of the enhanced document sequentially, and correct any incorrectly translated or enhanced words or phrases.

FIG. 12 is an example user interface 1200 of the translation system 200 for defining a term by a linguistic content enhancer 208. A term may have different meanings in different contexts. For example, the term "King" in the translated document can be defined by the linguistic content enhancer 208 as "King on chessboard" to avoid ambiguities.

FIG. 13 is an example user interface 1300 of the translation system 200 for a forbidden phrase identified by a linguistic content enhancer 208. A term may be inappropriate in a particular context. For example, the word "mighty" is identified by the linguistic content enhancer 208 as a "forbidden phrase" in the translated document, and the reason or justification provided by the linguistic content enhancer 208 is that "not good for translation".

Figure 14:
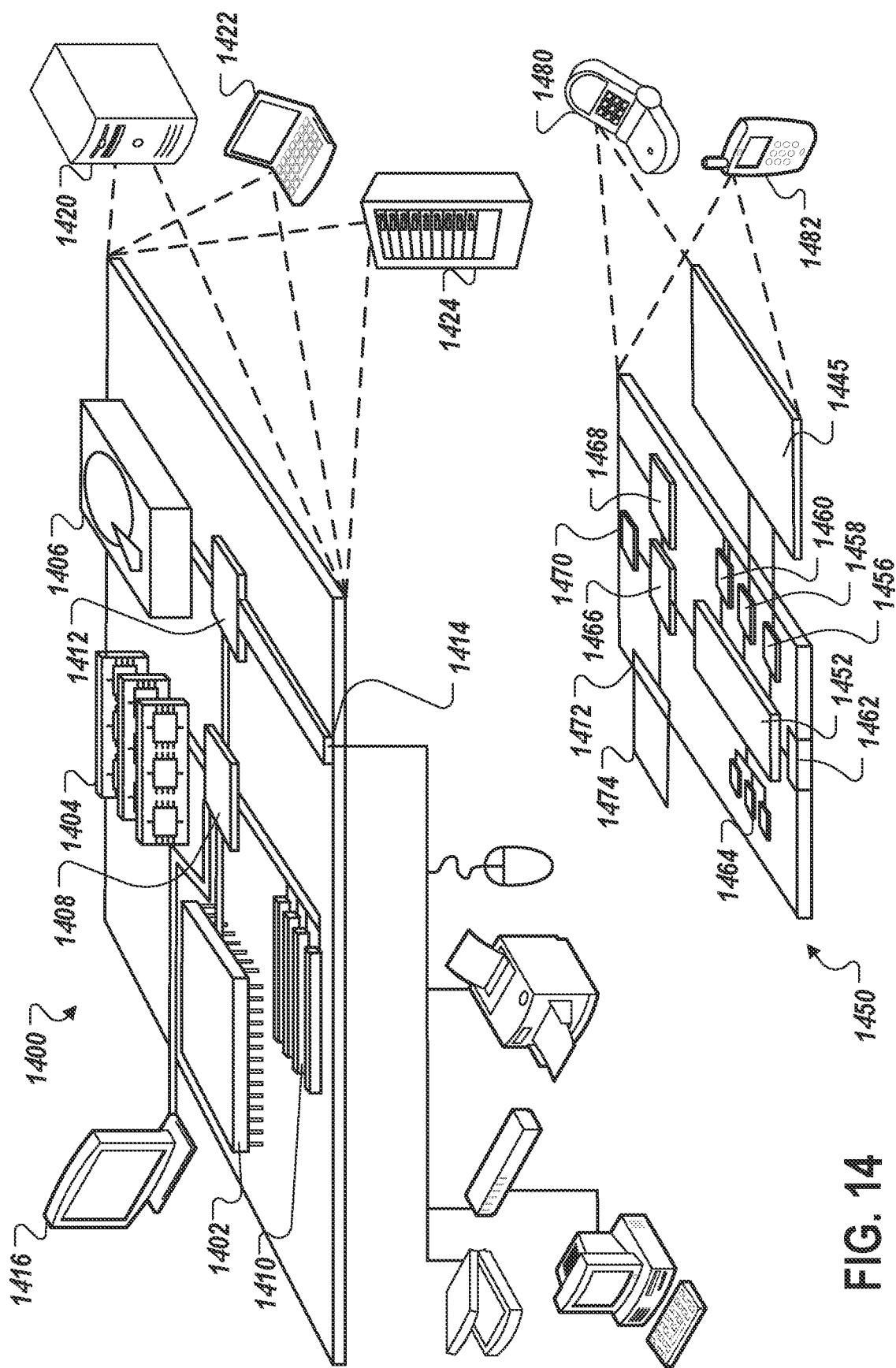
FIG. 14 is a block diagram of an example computing system.

FIG. 14 is a block diagram of computing devices 1400, 1450 that may be used to implement the systems and methods described in this disclosure, either as a client or as a server or multiple servers. Computing device 1400 and 1450 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations described and/or claimed in this document.

Computing device 1400 includes a processor 1402, memory 1404, a storage device 1406, a high-speed interface 1408 connecting to memory 1404 and high-speed expansion ports 1410, and a low speed interface 1412 connecting to low speed bus 1414 and storage device 1406. Each of the components 1402, 1404, 1406, 1408, 1410, and 1412, are interconnected using various busses, and may be mounted on a common motherboard or in other manners as appropriate. The processor 1402 can process instructions for execution within the computing device 1400, including instructions stored in the memory 1404 or on the storage device 1406 to display graphical information for a GUI on an external input/output device, such as display 1416 coupled to high speed interface 1408. In other implementations, multiple processors and/or multiple buses may be used, as appropriate, along with multiple memories and types of memory. Also, multiple computing devices 1400 may be connected, with each device providing portions of the necessary operations, e.g., as a server bank, a group of blade servers, or a multi-processor system.

The memory 1404 stores information within the computing device 1400. In one implementation, the memory 1404 is a computer-readable medium. In one implementation, the memory 1404 is a volatile memory unit or units. In another implementation, the memory 1404 is a non-volatile memory unit or units.

The storage device 1406 is capable of providing mass storage for the computing device 1400. In one implementation, the storage device 1406 is a computer-readable medium. In various different implementations, the storage device 1406 may be a floppy disk device, a hard disk device, an optical disk device, or a tape device, a flash memory or other similar solid-state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1404, the storage device 1406, or memory on processor 1402.

The high-speed controller 1408 manages bandwidth-intensive operations for the computing device 1400, while the low speed controller 1412 manages lower bandwidth-intensive operations. Such allocation of duties is exemplary only. In one implementation, the high-speed controller 1408 is coupled to memory 1404, display 1416, e.g., through a graphics processor or accelerator, and to high-speed expansion ports 1410, which may accept various expansion cards (not shown). In the implementation, low-speed controller 1412 is coupled to storage device 1406 and low-speed expansion port 1414. The low-speed expansion port, which may include various communication ports, e.g., USB, Bluetooth, Ethernet, wireless Ethernet, may be coupled to one or more input/output devices, such as a keyboard, a pointing device, a scanner, or a networking device such as a switch or router, e.g., through a network adapter.

The computing device 1400 may be implemented in a number of different forms, as shown in the figure. For example, it may be implemented as a standard server 1420, or multiple times in a group of such servers. It may also be implemented as part of a rack server system 1424. In addition, it may be implemented in a personal computer such as a laptop computer 1422. Alternatively, components from computing device 1400 may be combined with other components in a mobile device (not shown), such as device 1450. Each of such devices may contain one or more of computing device 1400, 1450, and an entire system may be made up of multiple computing devices 1400, 1450 communicating with each other.

Computing device 1450 includes a processor 1452, memory 1464, an input/output device such as a display 1454, a communication interface 1466, and a transceiver 1468, among other components. The device 1450 may also be provided with a storage device, such as a Microdrive or other device, to provide additional storage. Each of the components 1450, 1452, 1464, 1454, 1466, and 1468, are interconnected using various buses, and several of the components may be mounted on a common motherboard or in other manners as appropriate.

The processor 1452 can process instructions for execution within the computing device 1450, including instructions stored in the memory 1464. The processor may also include separate analog and digital processors. The processor may provide, for example, for coordination of the other components of the device 1450, such as control of user interfaces, applications run by device 1450, and wireless communication by device 1450.

Processor 1452 may communicate with a user through control interface 1458 and display interface 1456 coupled to a display 1454. The display 1454 may be, for example, a TFT LCD display or an OLED display, or other appropriate display technology. The display interface 1456 may include appropriate circuitry for driving the display 1454 to present graphical and other information to a user. The control interface 1458 may receive commands from a user and convert them for submission to the processor 1452. In addition, an external interface 1462 may be provided in communication with processor 1452, so as to enable near area communication of device 1450 with other devices.

External interface 1462 may provide, for example, for wired communication, e.g., via a docking procedure, or for wireless communication, e.g., via Bluetooth or other such technologies.

The memory 1464 stores information within the computing device 1450. In one implementation, the memory 1464 is a computer-readable medium. In one implementation, the memory 1464 is a volatile memory unit or units. In another implementation, the memory 1464 is a non-volatile memory unit or units. Expansion memory 1474 may also be provided and connected to device 1450 through expansion interface 1472, which may include, for example, a SIMM card interface. Such expansion memory 1474 may provide extra storage space for device 1450, or may also store applications or other information for device 1450. Specifically, expansion memory 1474 may include instructions to carry out or supplement the processes described above, and may include secure information also. Thus, for example, expansion memory 1474 may be provided as a security module for device 1450, and may be programmed with instructions that permit secure use of device 1450. In addition, secure applications may be provided via the SIMM cards, along with additional information, such as placing identifying information on the SIMM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 1464, expansion memory 1474, or memory on processor 1452.

Device 1450 may communicate wirelessly through communication interface 1466, which may include digital signal processing circuitry where necessary. Communication interface 1466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 1468. In addition, short-range communication may occur, such as using a Bluetooth, Wi-Fi, or other such transceiver (not shown). In addition, GPS receiver module 1470 may provide additional wireless data to device 1450, which may be used as appropriate by applications running on device 1450.

Device 1450 may also communicate audibly using audio codec 1460, which may receive spoken information from a user and convert it to usable digital information. Audio codec 1460 may likewise generate audible sound for a user, such as through a speaker, e.g., in a handset of device 1450. Such sound may include sound from voice telephone calls, may include recorded sound, e.g., voice messages, music files, etc., and may also include sound generated by applications operating on device 1450.

The computing device 1450 may be implemented in a number of different forms, as shown in the figure. For example, it may be implemented as a cellular telephone 1480. It may also be implemented as part of a smartphone 1482, personal digital assistant, or other similar mobile device.

Various implementations of the systems and techniques described here can be realized in digital electronic circuitry, integrated circuitry, specially designed ASICs, computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs, also known as programs, software, software applications or code, include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back-end component, e.g., as a data server, or that includes a middleware component such as an application server, or that includes a front-end component such as a client computer having a graphical user interface or a Web browser through which a user can interact with an implementation of the systems and techniques described here, or any combination of such back-end, middleware, or front-end components. The components of the system can be interconnected by any form or medium of digital data communication such as, a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

Memory stores program instructions and data used by the processor of the intrusion detection panel. The memory may be a suitable combination of random access memory and read-only memory, and may host suitable program instructions (e.g. firmware or operating software), and configuration and operating data and may be organized as a file system or otherwise. The program instructions stored in the memory of the panel may store software components allowing network communications and establishment of connections to the data network.

Program instructions stored in the memory, along with configuration data may control overall operation of the system. Server computer systems include one or more processing devices (e.g., microprocessors), a network interface and a memory (all not illustrated). Server computer systems may physically take the form of a rack mounted card and may be in communication with one or more operator terminals (not shown).

All or part of the processes described herein and their various modifications (hereinafter referred to as "the processes") can be implemented, at least in part, via a computer program product, i.e., a computer program tangibly embodied in one or more tangible, physical hardware storage devices that are computer and/or machine-readable storage devices for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks.

Tangible, physical hardware storage devices that are suitable for embodying computer program instructions and data include all forms of non-volatile storage, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks and volatile computer memory, e.g., RAM such as static and dynamic RAM, as well as erasable memory, e.g., flash memory.

In addition, the logic flows depicted in the figures do not require the particular order shown, or sequential order, to achieve desirable results. In addition, other actions may be provided, or actions may be eliminated, from the described flows, and other components may be added to, or removed from, the described systems. Likewise, actions depicted in the figures may be performed by different entities or consolidated.

Elements of different embodiments described herein may be combined to form other embodiments not specifically set forth above. Elements may be left out of the processes, computer programs, Web pages, etc. described herein without adversely affecting their operation. Furthermore, various separate elements may be combined into one or more individual elements to perform the functions described herein.

Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method comprising:
   receiving, by one or more processors, a linguistic document comprising a keyword associated with a translation service;
   identifying, by the one or more processors, a first node of a directed graph, the directed graph including a root node and nodes connected by edges, each node having a title,
      wherein the directed graph includes semantic paths, each semantic path being from the root node to a node having a title that at least partially matches the keyword, and
      wherein the first node has a title matching the keyword associated with the translation service;
   identifying, by the one or more processors, a second node of the directed graph for each of a plurality of service providers, each second node having a title matching a skill of a respective service provider,
      wherein each second node is connected to a third node of the directed graph, the third node having a title indicating an identification (ID) of the respective service provider, and wherein the third node is connected to the second node corresponding to the respective service provider by an edge having a title indicating a language pair for the translation service;
   determining, by the one or more processors, a distance between the first node and each second node along a particular semantic path in the directed graph, wherein the distance indicates a number of nodes connected by edges between the first node and each second node along the particular semantic path;
   ranking, by the one or more processors, the plurality of service providers based at least in part on the distance between the first node and each second node;
   performing, by the one or more processors, a machine translation of the linguistic document using a machine translation engine to generate a translated linguistic document; and
   providing, by the one or more processors, the translated linguistic document to a particular service provider for enhancement, the particular service provider having been selected based on the ranking.

2. The method of claim 1, comprising generating the directed graph.

3. The method of claim 2, wherein generating the directed graph comprises:
   in a main directed graph that includes a main root node and main nodes connected by main edges, identifying one or more of the main nodes that each has a title that at least partially matches the keyword;
   determining a distance along the main directed graph from the main root node to each of the identified main nodes;

selecting one or more of the identified main nodes based on the distance from the main root node to each identified main node; and generating the directed graph, wherein the selected main nodes are a plurality of nodes of the directed graph, each of the plurality of nodes having a title that at least partially matches the keyword.

4. The method of claim 3, comprising selecting a predefined number of the identified main nodes.

5. The method of claim 3, comprising generating the main directed graph based on a hierarchical classification of skills.

6. The method of claim 3, comprising updating the main directed graph based on an update to a hierarchical classification of skills.

7. The method of claim 3, comprising:

identifying the one or more of the main nodes using regular expressions.

8. The method of claim 1, comprising ranking the plurality of service providers based at least in part on an indication of a capability of each service provider to provide the translation service from a first language to a second language.

9. The method of claim 1, comprising ranking the plurality of service providers based in part on a quality metric for each service provider.

10. The method of claim 9, comprising determining the quality metric for each service provider, wherein the quality metric for each service provider is based on a record for the service provider that is stored in a blockchain.

11. The method of claim 1, further comprising anonymizing or redacting the linguistic document prior to performing the machine translation using the machine translation engine.

12. The method of claim 1, wherein at least some of the plurality of service providers are linguistic content enhancers.

13. A system, comprising:
at least one processor; and
a memory storing instructions thereon that, when executed by the at least one processor, cause the at least one processor to perform the method of claim 1.

14. A non-transitory, computer-readable storage medium having instructions stored thereon, that when executed by at least one processor, cause the at least one processor to perform the method of claim 1.

* * * * *